United States Patent
Cho et al.

(10) Patent No.: US 11,194,361 B1
(45) Date of Patent: Dec. 7, 2021

(54) DISPLAY APPARATUS

(71) Applicant: LG Display Co., Ltd., Seoul (KR)

(72) Inventors: Seokhyo Cho, Goyang-si (KR); Yongjoon Jeon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/139,272

(22) Filed: Dec. 31, 2020

(30) Foreign Application Priority Data

Aug. 7, 2020 (KR) .......................... 10-2020-0099476

(51) Int. Cl.
*G06F 1/16* (2006.01)
*F16M 11/04* (2006.01)
*G06F 3/147* (2006.01)

(52) U.S. Cl.
CPC .......... *G06F 1/1607* (2013.01); *F16M 11/046* (2013.01); *G06F 3/147* (2013.01)

(58) Field of Classification Search
CPC ...... G06F 1/1607; G06F 3/147; F16M 11/046
USPC ......................................................... 345/679
See application file for complete search history.

(56) References Cited

U.S. PATENT DOCUMENTS

| | | | | |
|---|---|---|---|---|
| 6,612,670 | B2 * | 9/2003 | Liu | ........................... A47G 5/00 160/351 |
| 7,806,490 | B1 * | 10/2010 | Buehl | .................. A47B 81/064 312/312 |
| 10,706,785 | B2 | 7/2020 | Kim | |
| 2002/0159240 | A1 * | 10/2002 | Watanabe | ............ B65D 81/055 361/752 |
| 2004/0090149 | A1 * | 5/2004 | Chang | ................. A47B 21/0073 312/7.2 |
| 2006/0077636 | A1 | 4/2006 | Kim | |
| 2010/0226079 | A1 * | 9/2010 | Fujikawa | .......... G02F 1/133308 361/679.01 |
| 2011/0261282 | A1 * | 10/2011 | Jean | ................... G02F 1/133308 349/58 |

(Continued)

FOREIGN PATENT DOCUMENTS

| | | |
|---|---|---|
| KR | 10-0564401 B1 | 3/2006 |
| KR | 10-2006-0032480 A | 4/2006 |

(Continued)

OTHER PUBLICATIONS

Notice of Preliminary Examination Result dated Sep. 7, 2020 from corresponding Korean Application No. 10-2020-0099476 and English translation with statement in 10 pages.

(Continued)

*Primary Examiner* — Kent W Chang
*Assistant Examiner* — Sujit Shah
(74) *Attorney, Agent, or Firm* — Polsinelli PC

(57) ABSTRACT

A display apparatus includes a display module including a display panel for displaying an image; and a housing module for housing the display module therein, wherein the housing module has a front opening defined therein corresponding to a portion of a display region of the display panel, in a stored mode in which an entirety of the display module is housed in the housing module, the portion of the display region is exposed to an outside of the housing module through the front opening, so that the display module displays Always On Display (AOD) data in the portion of the display region corresponding to the front opening, thus to implement an AOD function.

23 Claims, 20 Drawing Sheets

(56) References Cited

U.S. PATENT DOCUMENTS

| | | | | |
|---|---|---|---|---|
| 2013/0170116 A1* | 7/2013 | In | ................................ | H05K 7/00 |
| | | | | 361/679.01 |
| 2017/0180675 A1* | 6/2017 | Kim | ........................ | H04R 1/028 |
| 2019/0014902 A1* | 1/2019 | Choi | .......................... | H05K 5/02 |

FOREIGN PATENT DOCUMENTS

| | | |
|---|---|---|
| KR | 10-0800074 B1 | 2/2008 |
| KR | 10-2017-0134844 A | 12/2017 |
| KR | 10-2019-0079241 A | 7/2019 |
| KR | 10-2019-0092980 A | 8/2019 |

OTHER PUBLICATIONS

Notice of Allowance dated Dec. 7, 2020 from corresponding Korean Application No. 10-2020-0099476 and English translation with statement in 10 pages.

* cited by examiner

DISPLAY APPARATUS

CROSS-REFERENCE TO RELATED APPLICATION

This application claims a benefit under 35 U.S.C. § 119(a) of Korean Patent Application No. 10-2020-0099476 filed on Aug. 7, 2020, which is hereby incorporated by reference in its entirety.

BACKGROUND

Field of the Disclosure

The present disclosure relates to a display apparatus including a display module and a housing that houses the display module.

Description of the Background

As an information society develops, the number of functions required for a display apparatus that displays an image is increasing.

An example of a function required for the display apparatus may be a function of providing various screen ratios such that a viewer views an image viewing conveniently.

Another example of a function required for the display apparatus may be a function of displaying data that may be identified by a user at any time.

In addition, a display apparatus disposed indoors such as televisions and monitors needs to have a design that may minimize deterioration of aesthetics of an indoor interior.

SUMMARY

Accordingly, the present disclosure is to provide a display apparatus that may minimize deterioration of aesthetics of an indoor interior.

The present disclosure is also to provide a display apparatus having an AOD (always on display) function.

A purpose of the present disclosure is to provide a display apparatus that may implement image display at various screen ratios.

The present disclosure is not limited to the above-mentioned purpose. Other purposes and advantages in accordance with the present disclosure as not mentioned above may be understood from following descriptions and more clearly understood from aspects in accordance with the present disclosure. Further, it will be readily appreciated that the purposes and advantages in accordance with the present disclosure may be realized by features and combinations thereof as disclosed in the claims.

An aspect of the present disclosure provides a display apparatus including a display module including a display panel, a housing module housing the display module and having a front opening defined therein corresponding to a portion of a display region of the display panel, and a lifting module disposed inside the housing module for lifting or lowering the display module. In a stored mode where an entirety of a display module is housed in a housing module, a portion of the display region of the display module is exposed to an outside through the front opening. Thus, in the stored mode, the display module displays AOD data in the portion of the display region corresponding to the front opening. Thus, the AOD function may be realized.

Moreover, the lifting module may allow the display region of the display panel to be partially housed inside the housing module. Thus, the image display may be implemented at various screen ratios.

The display module and lifting module are housed in the housing module, such that deterioration of the aesthetics of the indoor interior due to the display apparatus may be reduced.

Effects in accordance with the present disclosure may be as follows but may not be limited thereto.

In the display apparatus according to an aspect of the present disclosure, the display module may be received in the housing module, such that the deterioration of the aesthetics of the indoor interior due to the installation of the display apparatus may be reduced.

In the stored mode where the entirety of the display module is housed in the housing module, a portion of the display regions of the display panel is exposed to the outside through the front opening of the housing module. Thus, AOD data may be displayed in the portion of the display region. Thus, the display apparatus may have an AOD function.

Changing a vertical level of the display module using the lifting module may change an amount of a portion of the display module as housed in the housing module. Therefore, the corresponding portion of the display region of the display panel may be hidden inside the housing module. Thus, a size of a display region viewable to a viewer may vary such that various screen ratios may be realized.

Thus, the aesthetics, the convenience, and the utility of the display apparatus may be improved.

In addition to the effects as described above, specific effects in accordance with the present disclosure will be described together with the detailed description for carrying out the disclosure.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
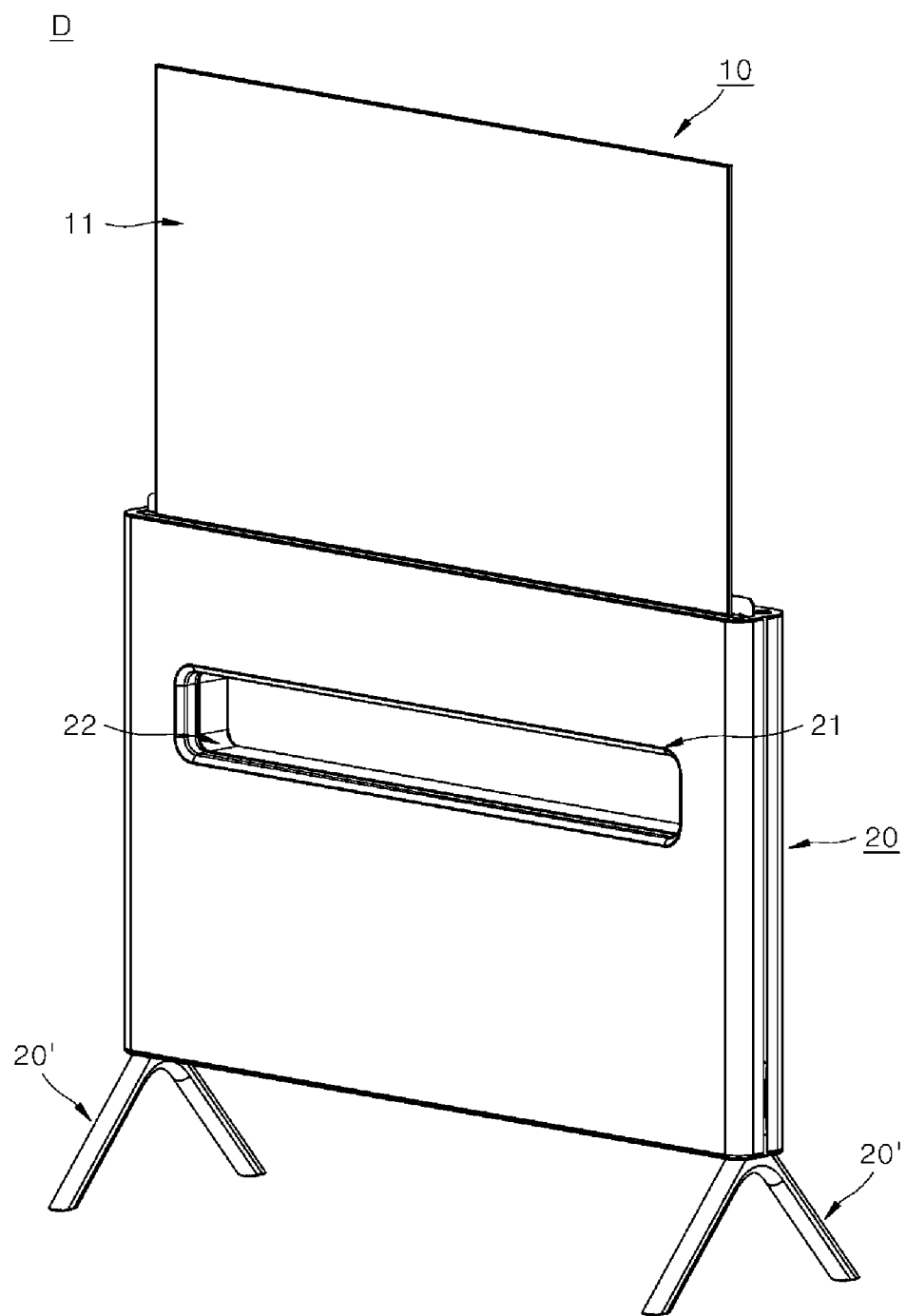
FIG. 1, FIG. 2, FIG. 3, FIG. 4, FIG. 5, and FIG. 6 are diagrams showing a display apparatus according to an aspect of the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various aspects are illustrated and described further below. It will be understood that the description herein is not intended to limit the claims to the specific aspects described. On the contrary, it is intended to cover alternatives, modifications, and equivalents as may be included within the spirit and scope of the present disclosure as defined by the appended claims.

The terminology used herein is for the purpose of describing particular aspects only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display apparatus and a method of operating the display apparatus according to an aspect of the present disclosure will be described with reference to the accompanying drawings.

First, a display apparatus according to an aspect of the present disclosure will be described with reference to FIG. 1, FIG. 2, FIG. 3, FIG. 4, FIG. 5, and FIG. 6.

FIG. 1, FIG. 2, FIG. 3, FIG. 4, FIG. 5, and FIG. 6 are diagrams showing a display apparatus according to an aspect of the present disclosure.

Figure 2:
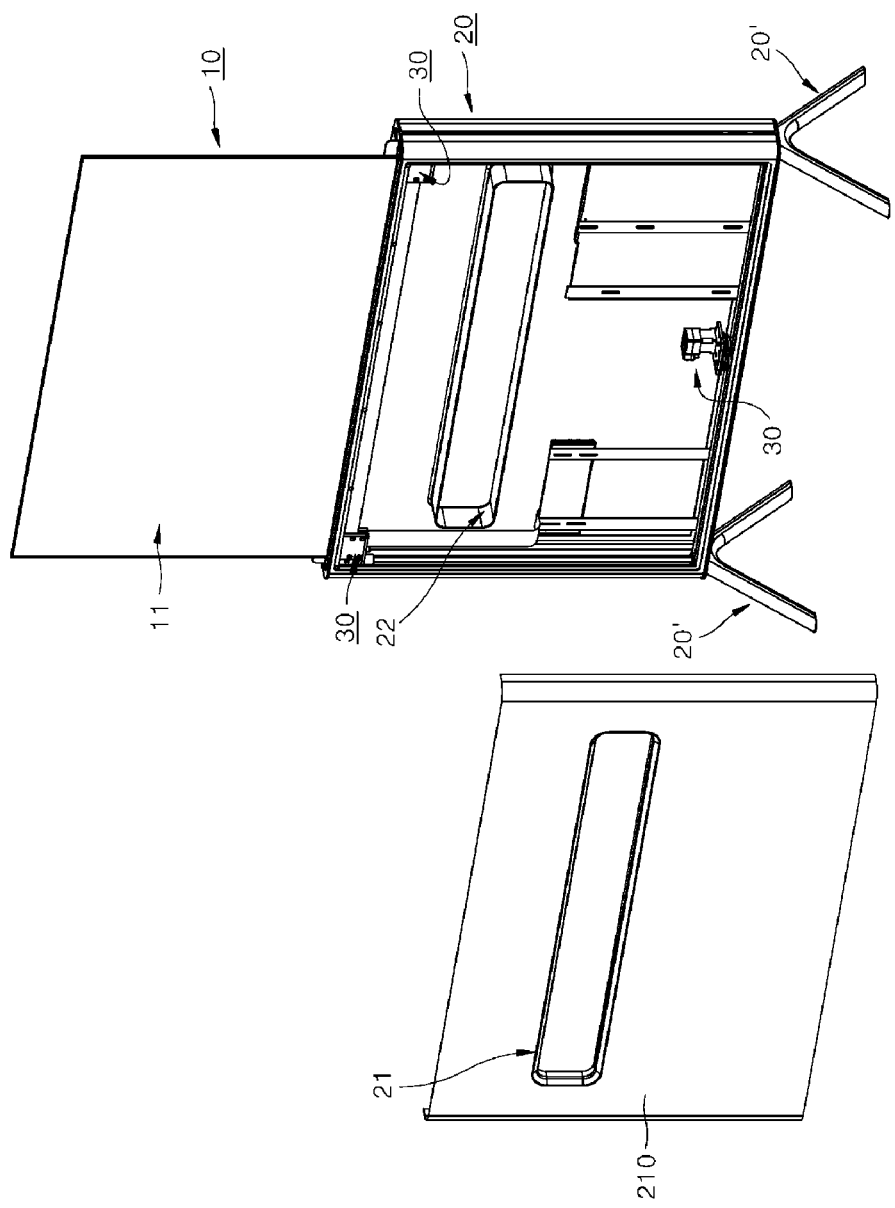

As shown in FIGS. 1 and 2, a display apparatus D according to an aspect of the present disclosure includes a flat-shaped display module 10, a housing module 20 that houses the flat-shaped display module 10, and a lifting module 30 that is disposed inside the housing module 20 and lifts or lowers the flat-shaped display module 10.

In other words, the display apparatus D includes the display module 10 that includes a display region in which an image is displayed and is lifted or lowered by the lifting module 30, and the housing module 20 that houses the display module 10 and the lifting module 30.

The display module 10 includes a display panel (110 in FIG. 8) having a display region 11 on which the image is displayed. Hereinafter, it is assumed that the display region 11 is located on a front face of the display panel 110. The display panel 110 emits light for image display in the display region.

The housing module 20 houses therein the flat-shaped display module 10 and the lifting module 30.

The housing module 20 has a front opening 21 defined therein corresponding to a portion of the front face of the display module 10. That is, a portion of the display region 11 of the display module 10 housed in the housing module 20 is exposed through the front opening 21 to the outside.

Moreover, the housing module 20 may further include a rear opening 22 opposite the front opening 21. That is, a portion of the rear face of the display module 10 housed in the housing module 20 is exposed through the rear opening 22 to the outside. Further, when the display module 10 is not housed in the housing module 20, a background in rear of the housing module 20 may be visible to the viewer through the front opening 21 and the rear opening 22.

The housing module 20 may be supported on a stand 20'.

The lifting module 30 supports the display module 10 and changes a vertical level of the display module 10 in a vertical direction.

Accordingly, the display apparatus D according to an aspect of the present disclosure may operate in one of following modes: a mode (hereinafter, referred to as a stored mode SM) in which an entirety of the display module 10 is accommodated in the housing module 20; a mode (hereinafter, a vertical movement mode LM) in which a vertical level of the display module 10 is changed by the lifting module 30; a mode (hereinafter, a general display mode GD) in which an entirety of the display region 11 of the display module 10 displays a general image; and a mode (hereinafter, a cinema display mode CD) in which an image is displayed in a portion of the display region 11 of the display module 10 at a screen ratio different from that of the general image in the general display mode.

That is, as shown in FIG. 1 and FIG. 2, the display module 10 is lifted by the lifting module 30, such that the entirety of the display region 11 of the display module 10 may be disposed outside of the housing module 20.

In this case, the display module 10 may operate in the general display mode GD in which the image is displayed in the entirety of the display region 11. Moreover, an object disposed behind the display apparatus D may be visually recognized by the viewer through the front opening 21 and the rear opening 22 of the housing module 20.

Figure 3:
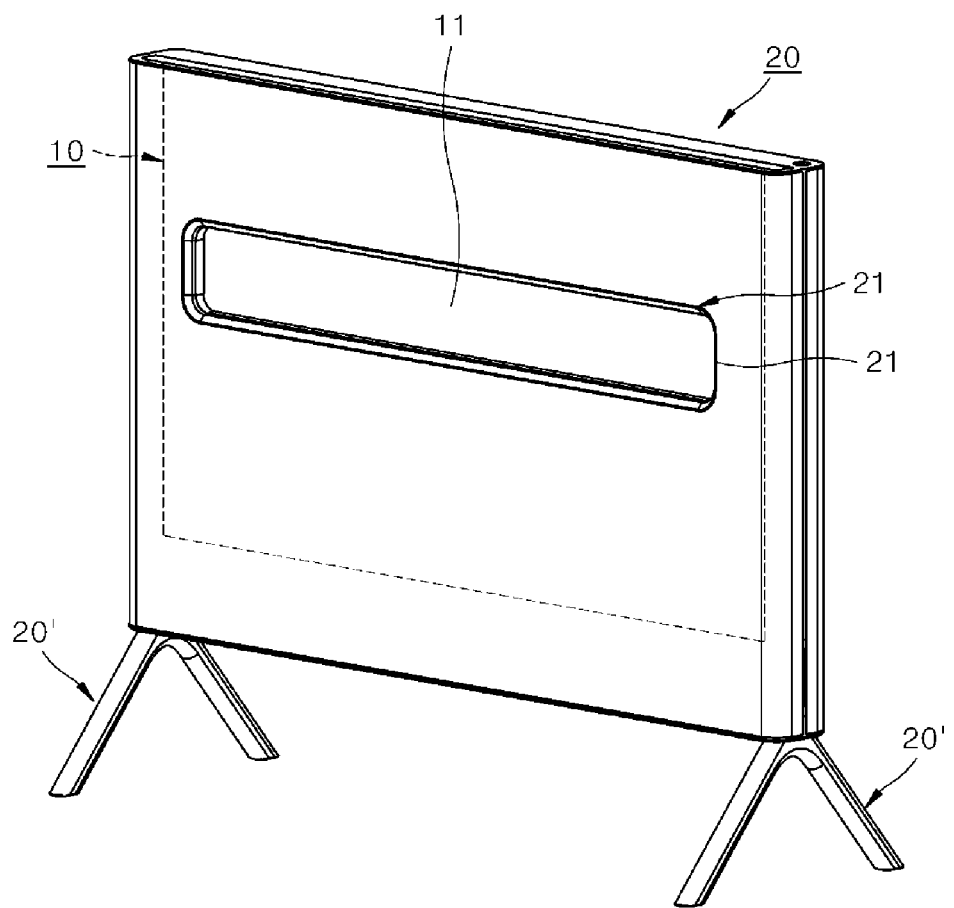

Alternatively, as shown in FIG. 3, the display module 10 is lowered by the lifting module 30, such that the entirety of the display module 10 may be stored inside the housing module 20.

In this connection, a portion of the display region 11 of the display module 10 may be visible to the viewer through the front opening 21 of the housing module 20. Accordingly, a portion of the display region 11 exposed through the front opening 21 of the housing module 20 may be a region in which AOD (Always On Display) data is displayed.

Figure 4:
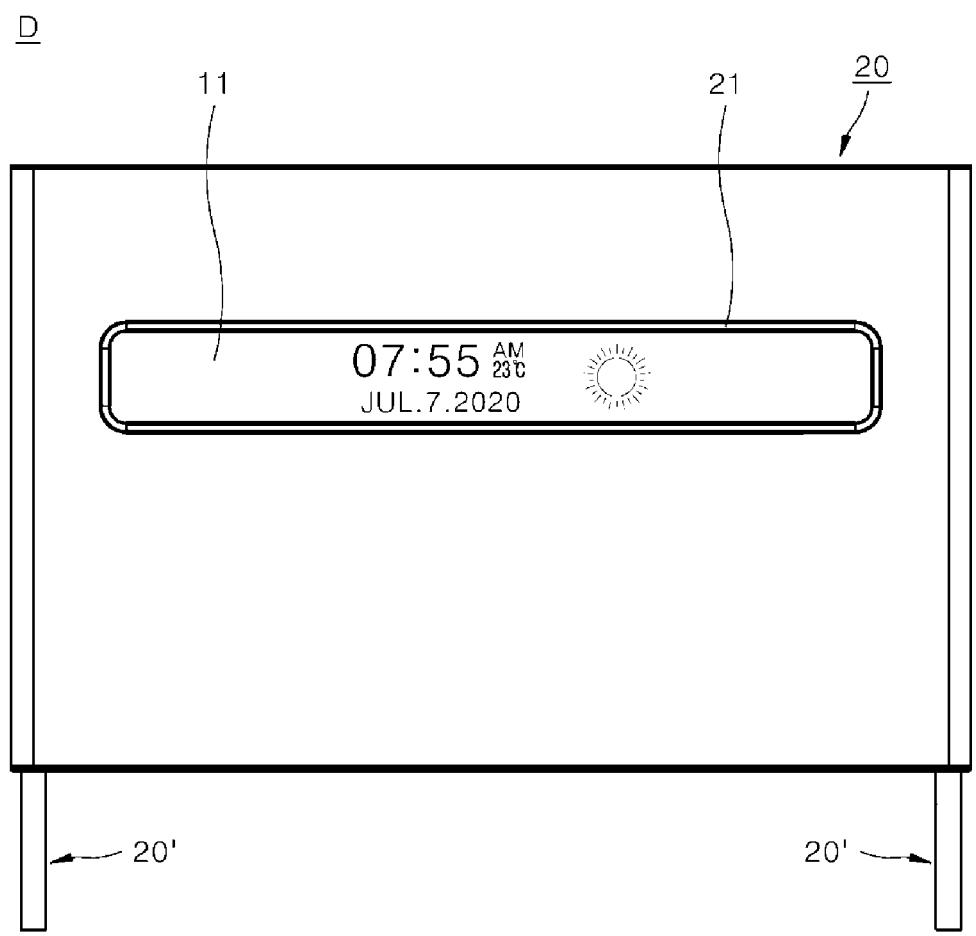

That is, as shown in FIG. 4, in the stored mode SM, the display module 10 may display the AOD data in a portion of the display region 11 exposed through the front opening 21 of the housing module 20.

Specifically, the stored mode SM may be an AOD (Always On Display) mode in which the AOD data as data that a user may view at any time is displayed even when the display apparatus D does not display an image in the display region.

In one example, the AOD data may include information on date, time, and weather. However, this is merely an example. A type of the AOD data may vary according to settings by the user.

In addition, whether the AOD data is displayed may be set by the user.

In one example, while the display apparatus D operates in the stored mode SM, the apparatus D may receive an AOD request signal from the user. Thus, the display module 10 may be changed from an off state to a state in which the AOD data is displayed.

Alternatively, while the display apparatus D is in the stored mode SM, the display module 10 may display or may not display the AOD data based on a predetermined setting which may include at least one of a period for which the AOD data should be displayed in the stored mode SM or whether the user is detected.

Figure 5:
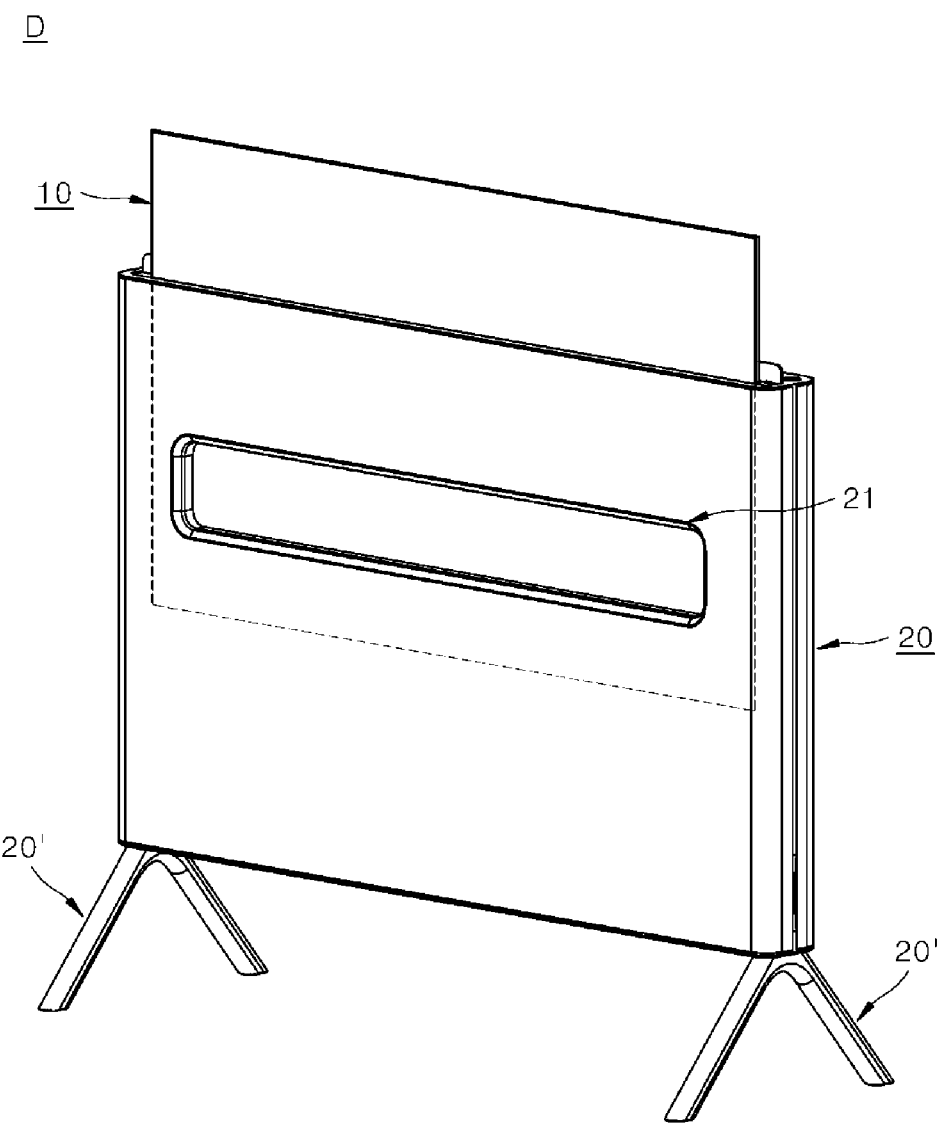

As shown in FIG. 5, in the vertical movement mode LM, the display module 10 may be raised or lowered by the lifting module 30. In this connection, a portion of the display module 10 above a top opening of the housing module 30 may be disposed outside the housing module 20, while a rest of the display module 10 below the top opening of the housing module 30 may be stored inside the housing module 20.

Figure 6:
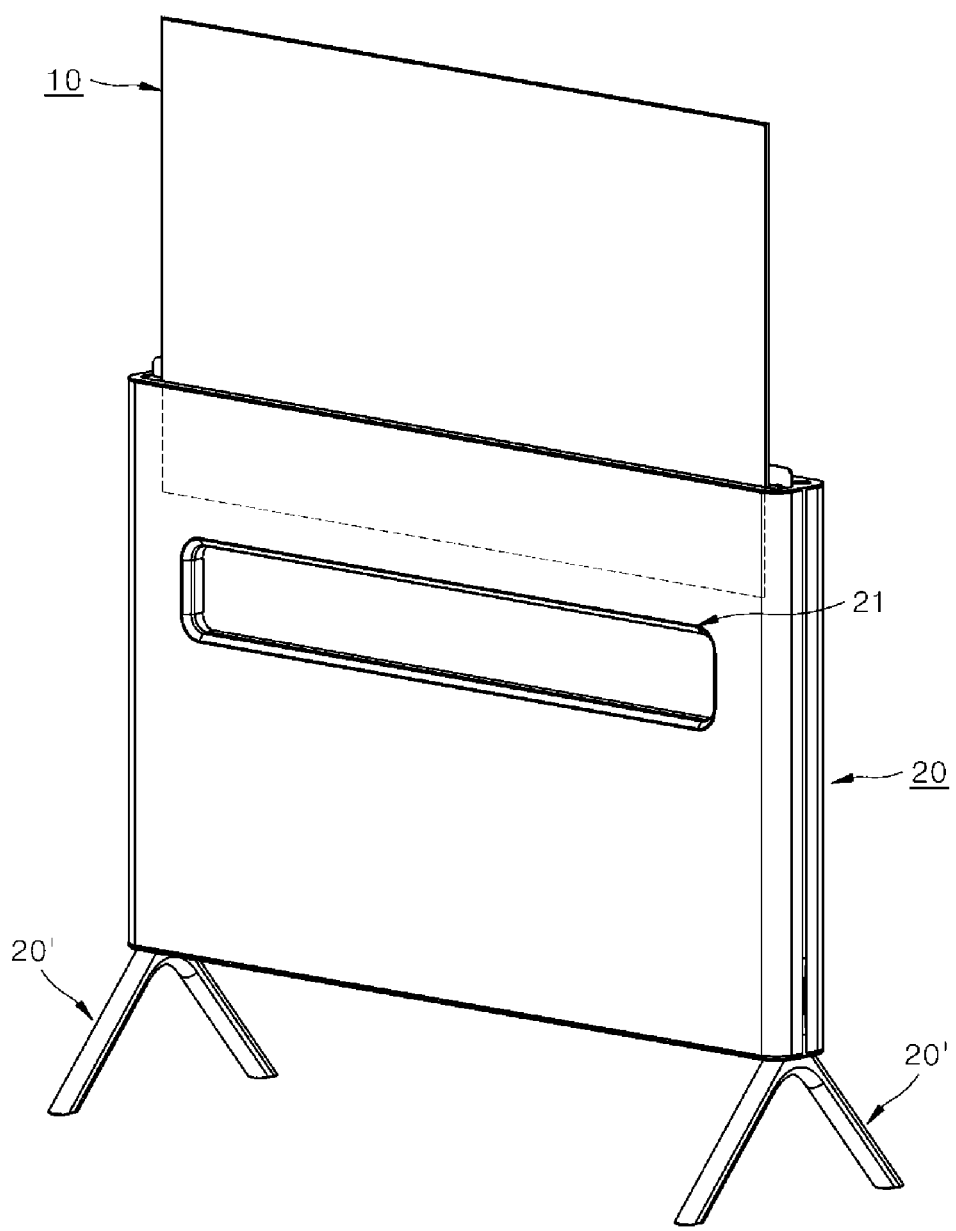

As shown in FIG. 6, in the cinema display mode CD, the display module 10 may display an image in the portion of the display region 11 disposed outside the housing module 20 at a specific screen ratio.

In one example, the screen ratio of the image may be defined as a ratio between a horizontal dimension and a vertical dimension of the screen. In the cinema display mode CD, an image having a higher screen ratio than that in the general display mode GD, that is, an image having a vertical dimension smaller than that in the general display mode GD is displayed. Accordingly, in the CD mode, a partial vertical region of the display region 11 may not be used for image display unlike the general display mode GD, and thus may be disposed inside the housing module 20.

In the cinema display mode CD in which an image is displayed at a screen ratio higher than that in the general display mode GD, the partial vertical region of the display region 11 that are not used for image display is not visible to the user, such that image visibility and convenience may be improved.

As previously stated, the display apparatus D according to an aspect of the present disclosure may operate in one of the stored mode SM (FIG. 3 and FIG. 4), the vertical movement mode LM (FIG. 5), the general display mode GD (FIG. 1 and FIG. 2), or the cinema display mode CD (FIG. 6).

Figure 7:
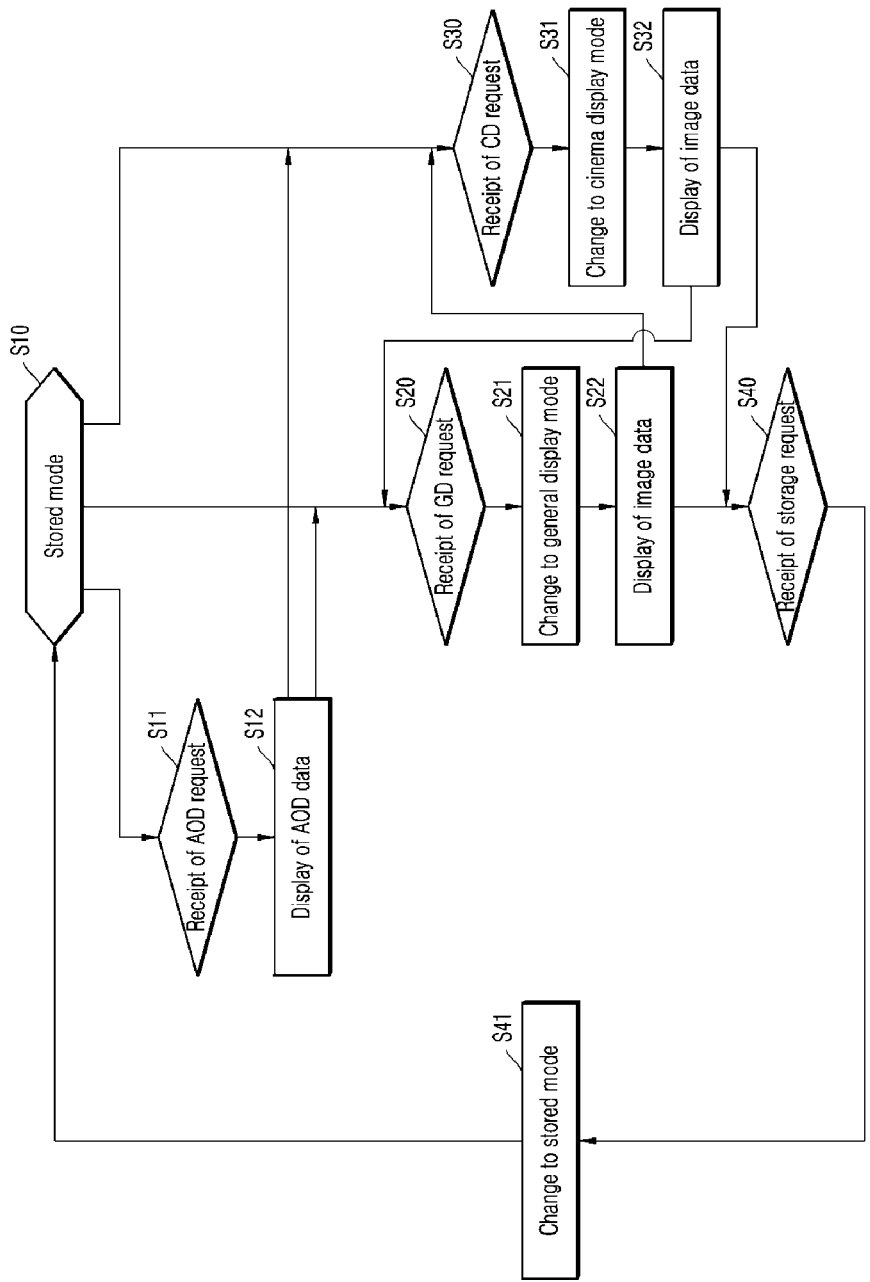
FIG. 7 is a diagram showing a method of operating a display apparatus according to an aspect of the present disclosure.

FIG. 7 is a diagram showing a method of operating a display apparatus according to an aspect of the present disclosure.

As shown in FIG. 7, a method of operating a display apparatus according to an aspect of the present disclosure may include: displaying (S12) AOD (Always On Display) data in a portion of the display region 11 of the display module 10 as exposed through front opening 21 of the housing module 20 upon receiving (S11) an AOD request signal from an user interface in the stored mode SM (S10); upon receiving (S20) a GD request signal from the user interface, changing (S21) a vertical level of the display module 10 to that corresponding to the general display mode GD, and displaying (S22) image data in the general display mode GD; upon receiving (S30) a CD request signal from the user interface, changing (S31) a vertical level of the display module 10 to that corresponding to the cinema display mode CD, and displaying (S32) image data in the cinema display mode CD; and upon receiving (S40) a storage request signal from the user interface, changing (S41) the vertical level of the display module 10 to that corresponding to the stored mode SM.

In this connection, the user interface may be an input device connected to the display apparatus D via wired or wireless communication. In one example, the user interface may be implemented as at least one of a keyboard, a mouse, a remote controller, or a smart device.

The method of operating the display apparatus according to an aspect of the present disclosure may further include receiving (S11) the AOD request signal from the user interface in any operation mode.

In this case, the display apparatus D may change (S41) the vertical level of the display module 10 to that corresponding to the stored mode SM based on the reception of the AOD request signal.

At the vertical level of the display module 10 corresponding to the stored mode SM, the entirety of the display module 10 is stored inside the housing module 20.

Moreover, the display apparatus D displays (S12) AOD (Always On Display) data in a portion of the display region 11 of the display module 10 as exposed through the front opening 21 of the housing module 20.

Alternatively, although not shown in FIG. 7, the display apparatus D may display the AOD data while maintaining the vertical level of the display module 10 at a same level as that at a time point when the apparatus D receives the AOD request signal from the user interface.

The method of operating the display apparatus according to an aspect of the present disclosure may further include changing (S21) the vertical level of the display module 10 to that corresponding to the general display mode GD upon receiving (S20) the GD request signal from the user interface in any operation mode.

At the vertical level of the display module 10 corresponding to the general display mode GD, the entirety of the display region 11 of the display module 10 is disposed outside of the housing module 20.

Moreover, the display apparatus D displays (S22) image data in the entirety of the display region 11 of the display module 10.

The method of operating the display apparatus according to an aspect of the present disclosure may further include changing (S31) the vertical level of the display module 10 to that corresponding to the cinema display mode CD when the CD request signal is received (S30) from the user interface in any operation mode.

At the vertical level of the display module 10 corresponding to the cinema display mode CD, a portion of the display region 11 of the display module 10 corresponding to a relatively high screen ratio are disposed outside the housing module 20, while the rest of the display region 11 of the display module 10 is disposed inside the housing module 20.

Moreover, the display apparatus D displays (S32) image data in the portion of the display region 11 of the display module 10 that is disposed outside of the housing module 20.

In one example, the screen ratio corresponding to the general display mode GD may be set to 16:9. The screen ratio corresponding to the cinema display mode CD may be set to 21:9. However, this is merely an example. As long as the screen ratio corresponding to the cinema display mode CD is higher than the screen ratio corresponding to the general display mode GD, the screen ratios thereof may be set in various ways according to the user's input.

The method of operating the display apparatus according to an aspect of the present disclosure may further include changing (S41) the vertical level of the display module 10 to that corresponding to the stored mode SM when the storage request signal is received (S40) from the user interface in any operation mode.

As described above, in the display apparatus D according to an aspect of the present disclosure, the housing module 20 includes the front opening 21. Thus, the AOD function in which the AOD data is displayed may be implemented even in the stored mode SM in which the entirety of the display module 10 is housed inside the housing module 20.

Accordingly, power consumption of the display module 10 due to the implementation of the AOD function may be minimized.

Further, the display apparatus D according to an aspect of the present disclosure includes the lifting module 30 that changes the vertical level of the display module 10 and the top opening defined in a top face of the housing module 20. Accordingly, a vertical dimension of the display region 11 of the display module 10 as exposed to the outside of the housing module 20 may be adjusted. Therefore, in the CD mode having the higher screen ratio than that in the general display mode GD, a portion of the display region 11 in which the image data is not displayed but is displayed in a black state may be hidden inside the housing module 20. Thus, convenience and utility of the display apparatus D may be improved.

Next, the display module 10 of the display apparatus D according to an aspect of the present disclosure will be described with reference to FIGS. 8, 9 and 10.

Figure 8:
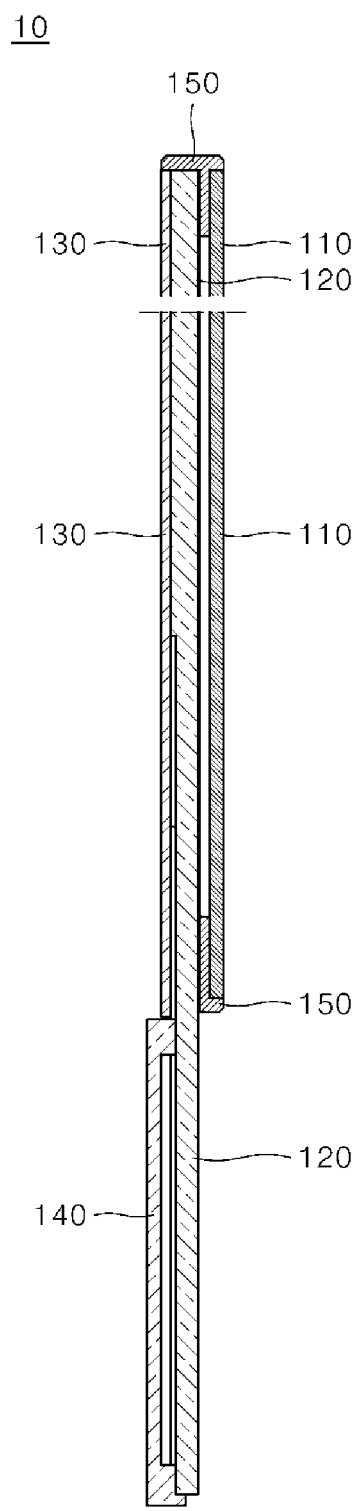
FIG. 8, FIG. 9, and FIG. 10 are diagrams showing a display module of a display apparatus according to an aspect of the present disclosure.
Figure 9:
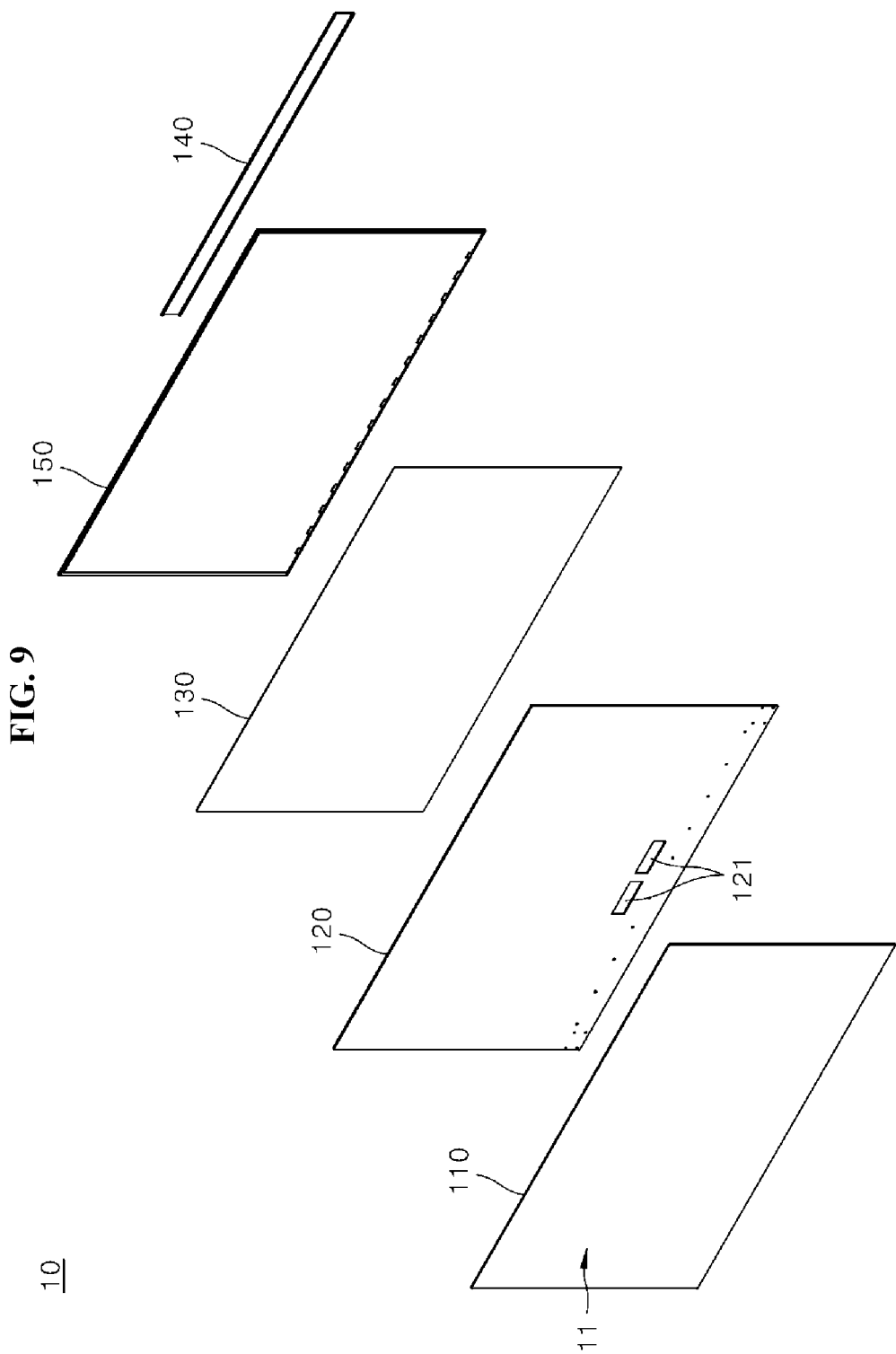
Figure 10:
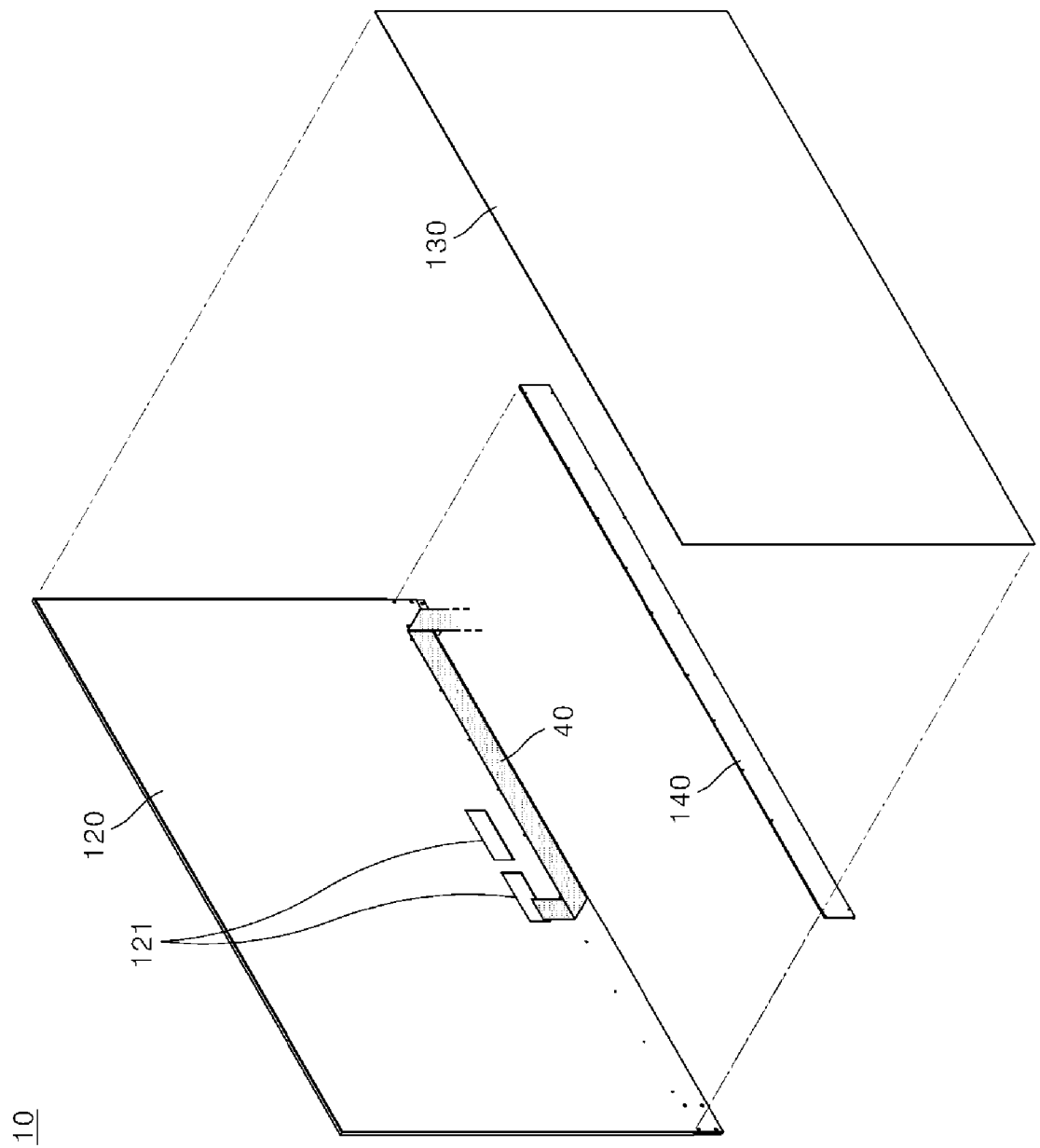

FIG. 8, FIG. 9, and FIG. 10 are diagrams showing a display module of a display apparatus according to an aspect of the present disclosure.

As shown in FIG. 8, the display module 10 of the display apparatus D according to an aspect of the present disclosure includes a display panel 110 having the display region 11 in which an image is displayed, and a support cover 120 facing a rear face of the display panel 110.

Moreover, the display module 10 further includes a protective cover 130 contacting the support cover 120 and spaced from the display panel 110, and an auxiliary cover 140 disposed on a lower edge of the support cover 120.

Further, the display module 10 may further include a side cover 150 covering an edge of the display panel 110.

Although not shown in detail in FIG. 8, the display panel 110 may include a pair of thin film substrates (not shown) facing away each other while a light emitting material or a polarizing material is disposed therebetween. This display panel 110 may display an image by controlling an amount of light emitted from each pixel region based on image data. In one example, the display panel 110 may include one of a liquid crystal display panel, a plasma display panel, a field emission display panel, an electrowetting display panel, an electroluminescent display panel, and an organic light emitting display panel.

In particular, the display panel 110 has a light emitting material, and does not require a separate light source, that is, may include one of an electroluminescent display panel, and an organic light emitting display panel. In this way, a weight of the display panel 110 may be reduced, and thus may be easily moved up and down by the lifting module 30.

The display panel 110 includes a plurality of pixel regions arranged in a matrix in the display region 11. Moreover, the display panel 110 may include a transistor array to individually drive each pixel region.

The transistor array may include a plurality of transistors corresponding to a plurality of pixel regions, gate lines supplying a gate signal for turning on each transistor, and data lines supplying a data signal corresponding to luminance of each pixel region.

The display panel 110 may further include a gate driver for driving the gate lines and a data driver for driving the data lines.

In one example, the gate driver together with the transistor array may be disposed between a pair of substrates.

In one example, the data driver may be disposed on a soft substrate connected to the transistor array. The soft substrate having the data driver mounted thereon may be fixed to a rear face of the display panel 110. Alternatively, the data driver may be mounted on one of a pair of substrates.

The gate driver and the data driver may operate based on a driving signal and a power signal supplied from an external component to the display panel 110 through a signal cable (40 FIG. 10).

The support cover 120 is embodied as a plate made of a metal material such as aluminum. The support cover 120 is thicker than at least the display panel 110. Rigidity of the display module 10 may be improved due to this support cover 120.

As a result, in the general display mode GD where the display module 10 is disposed outside of the housing module 20, a shape of the display module 10 may be reliably maintained even when a substantial region of the display panel 10 is not housed in the housing module 20.

For example, a thickness of the support cover 120 may be about 3.5 mm.

The support cover 120 has a horizontal dimension similar to that of the display panel 110 and a vertical dimension longer than that of the display panel 110. That is, the support cover 120 includes a downward protruding region from the display panel 110.

The support cover 120 may be fixed to the display panel 110 via a double-sided tape (not shown) disposed between the rear face of the display panel 110 and the support cover 120.

As shown in FIG. 9, the support cover 120 includes a cable outlet hole 121 for drawing out the signal cable (40 in FIG. 10) connected to the display panel 110.

The cable outlet hole 121 may pass through the support cover 120 and may be adjacent to a lower edge of the display panel 110. In one example, the cable outlet hole 121 may be disposed adjacent to a central region of the lower edge of the display panel 110.

As shown in FIG. 10, the signal cable 40 drawn out through the cable outlet hole 121 may extend in a parallel manner to a portion of the lower edge of the support cover 120, and then may be downwards bent from one end of the lower edge of the support cover 120. As a result, one portion of the signal cable 40 may extend in a parallel manner to the portion of the lower edge of the support cover 120, and another portion of the signal cable 40 may be disposed inside the housing module 20. This signal cable 40 is connected to at least one printed circuit board (51, 52, and 53 in FIG. 15) disposed inside the housing module 20.

The protective cover 130 contacts the support cover 120 and is fixed to the support cover 120. That is, the protective cover 130 faces away the display panel 110 while the support cover 120 is disposed therebetween. Thus, the support cover 120 is disposed between the rear face of the display panel 110 and the protective cover 130.

This protective cover 130 covers the cable outlet hole 121 while the signal cable 40 is drawn out. That is, the protective cover 130 may prevent the cable outlet hole 121 through which the signal cable 40 is drawn out from being exposed to the outside.

The protective cover 130 is disposed outside the display module 10. When the display module 10 is disposed outside the housing module 20, the protective cover 130 may be visible to the user located in rear of the display apparatus D.

Accordingly, in order to prevent the deterioration of the aesthetics of the display apparatus D, the protective cover 130 may be embodied as a flat plate made of a metal material that is subjected to finishing treatment to minimize scratches and roughness.

Further, the protective cover 130 may have a thickness smaller than that of the support cover 120.

The auxiliary cover 140 is disposed on the lower edge of the support cover 120.

The auxiliary cover 140 covers the signal cable 40 drawn out through the cable outlet hole 121, and extending in parallel to a portion of the lower edge of the support cover 120. That is, the signal cable 40 drawn out through the cable outlet hole 121 is disposed between the support cover 120 and the auxiliary cover 140.

This auxiliary cover 140 may be fixed to both ends of the lower edge of the support cover 120 via separate fastening means. In one example, the auxiliary cover 140 and the support cover 120 may be coupled to each other by means of at least one screw inserted into at least one hole passing through the auxiliary cover 140 and the support cover 120.

As described above, the display module 10 according to an aspect of the present disclosure includes the support cover 120 fixed to the rear face of the display panel 110 for supporting the display panel 110. Thus, even when the display module 10 is not supported by the housing module 20, the shape thereof may be maintained in a reliable manner.

Further, the display module 10 may be connected to at least one printed circuit board disposed inside the housing module 20 via the signal cable 40. Thus, the display module 10 does not have at least one printed circuit board that supplies signals to drive the gate driver and data driver of the display panel 110. Thus, a weight of the display module 10 may be reduced.

Next, the housing module 20 of the display apparatus D according to an aspect of the present disclosure will be described.

FIG. 11, FIG. 12, FIG. 13, FIG. 14, and FIG. 15 are diagrams showing a housing module of a display apparatus according to an aspect of the present disclosure.

Figure 11:
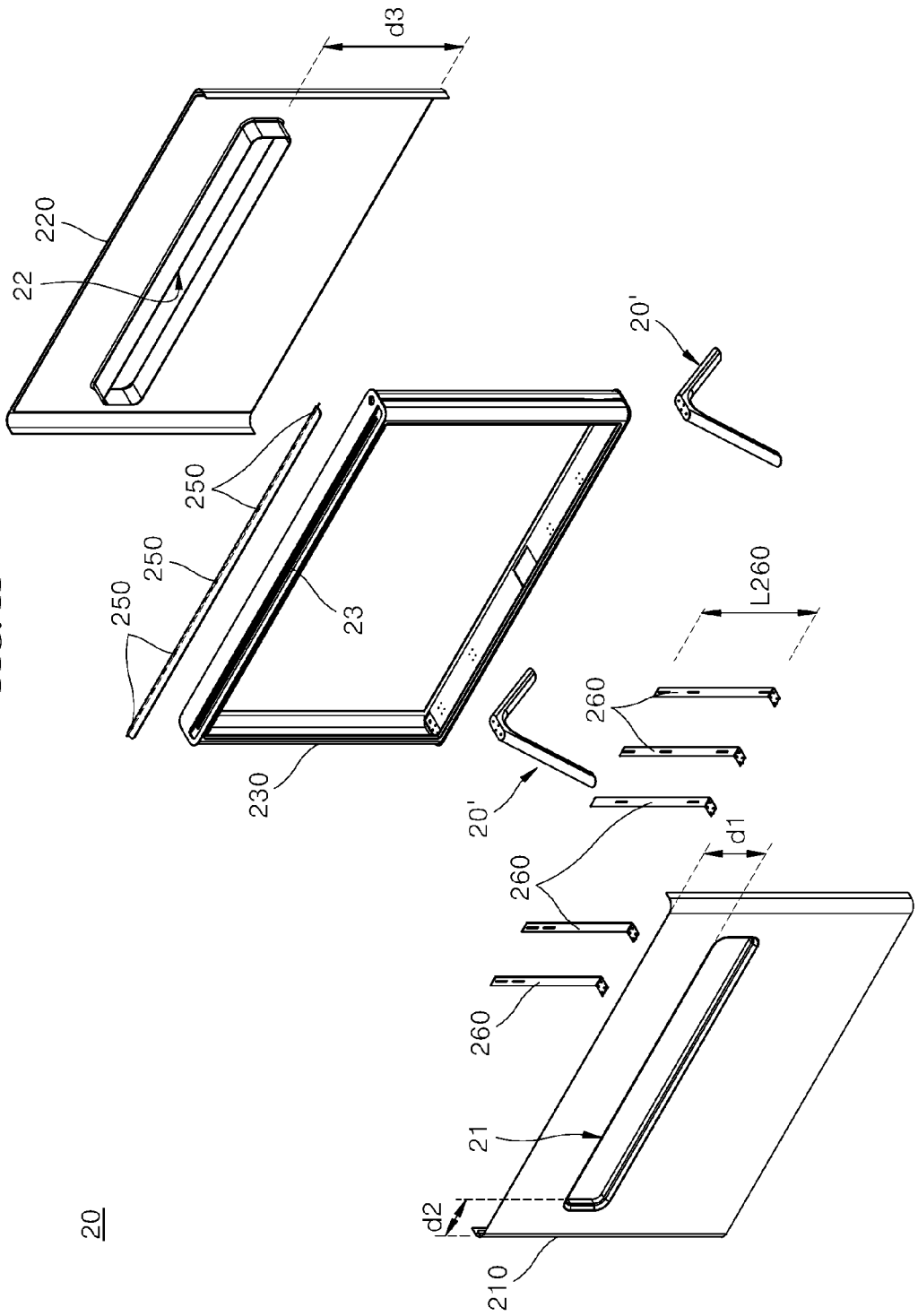
FIG. 11, FIG. 12, FIG. 13, FIG. 14, and FIG. 15 are diagrams showing a housing module of a display apparatus according to an aspect of the present disclosure.

As shown in FIG. 11, the housing module 20 includes a front plate 210 facing a front face of the display panel 110 corresponding to the display region 11, a back plate 220 facing away the front plate 210, and a side plate 230 disposed between the front plate 210 and the back plate 220 and formed in a frame shape.

The front plate 210 has a front opening 21 defined therein corresponding to a portion of the display region 11. Because a portion of the display region 11 of the display module 10 may be visually recognized by the user in the stored mode SM through this front opening 21, the AOD function may be realized.

In addition, the screen ratio may be determined based on a size of a lower portion of the display region 11 of the display module 10 as disposed between a top edge of the front plate 210 and the front opening 21. Thus, a portion of the display region 11 corresponding to the screen ratio may act as an active screen.

In this connection, a spacing d1 between the top edge of the front plate 210 and the front opening 21 is larger than a vertical dimension corresponding to a difference between the screen ratio in the general display mode GD and that in the cinema display mode CD. Thus, the portion of the display region 11 may be hidden in the space between the top of the front opening 21 and the top of the front plate 210. Thus, the screen ratio corresponding to the cinema display mode CD may be implemented.

Moreover, the signal cable 40 connected to the display panel 110 of the display module 10 and drawn out through the cable outlet hole 121 of the support cover 120 may be accommodated between the display module 10 and the front plate 210. That is, the signal cable 40 may be disposed in a space between a side edge of the front plate 210 and the front opening 21.

In this connection, a spacing d2 between the side edge of the front plate 210 and the front opening 21 is greater than a width of the signal cable 40. In this way, the signal cable 40 disposed in the space between the side edge of the front plate 210 and the front opening 21 may be prevented from being visually recognized by the user through the front opening 21 or a rear opening 22.

The back plate 220 has the rear opening 22 defined therein opposite the front opening 21.

In this way, as the housing module 20 includes the front opening 21 and the rear opening 22, a portion of the front face of the display panel 110 constituting the display region 11 is exposed to the outside of the housing module 20 through the front opening 21, and a portion of the rear face of the display module 10 is exposed to the outside of the housing module 20 through the rear opening 22, in the stored mode SM in which the entirety of the display module 10 is housed in the housing module 20.

Further, as shown in FIG. 1, FIG. 2 and FIG. 4, the portion of the display module 10 lifted by the lifting module 30 is disposed outside the housing module 20. Thus, the display module 10 may not be disposed between the front opening 21 and the rear opening 22. In this case, an object disposed behind the display apparatus D may be visually recognized by the user through the front opening 21 and the rear opening 22. Thus, the display apparatus D may be recognized by the user as a portion of the indoor interior, thereby improving the aesthetics of the indoor interior.

Referring back to FIG. 11, the side plate 230 is made in a form of a frame, and constitutes both sides, top and bottom of the housing module 20. The side plate 230 has a top opening 23 defined therein and extends horizontally in a corresponding manner to a horizontal dimension of the display module 10.

While the display module 10 is lifted or lowered by the lifting module 30, the display module 10 may enter and exit the housing module 20 through the top opening 23.

Further, the housing module 20 may further include a top plate 240 covering the top opening 23 of the side plate 230 and a hinge 250 disposed between the top plate 240 and a top face of the side plate 230 to allow opening and closing of the top plate 240.

That is, the top plate 240 is fixed to the top face of the side plate 230 via the hinge 250, and opens and closes the top opening 23.

In one example, in the stored mode SM, the top plate 240 covers and closes the top opening 23. Moreover, when at least a portion of the display module 10 protrudes out of the housing module 20 through the top opening 23, the top plate 240 may be removed from the top opening 23 while the display module 10 pushes up the top plate 240.

In this way, the top plate 240 and the hinge 250 that open and close the top opening 23 may prevent foreign materials from flowing into an interior of the housing module 20 through the top opening 23 in the stored mode SM.

Further, the housing module 20 may further include a plurality of slot bars 260 fixed to a bottom face of the side plate 230. The slot bars 260 may allow at least one printed circuit board (51, 52, 53 in FIG. 15) for driving the display panel 110 to be disposed inside the housing module 20. That is, each of at least one printed circuit board (51, 52, and 53 in FIG. 15) may be disposed between and fixed to two adjacent slot bars among the plurality of slot bars 260.

In this connection, a vertical dimension L260 of each of the multiple slot bars 260 is smaller than a spacing between the front opening 21 and a bottom edge of the front plate 210. Since the rear opening 22 corresponds to the front opening 21, a spacing d3 between the rear opening 22 and a bottom edge of the back plate 220 may be identical to the spacing between the front opening 21 and a bottom edge of the front plate 210. The bottom edge of the front plate 210 corresponds to a bottom face of the side plate 230.

In this way, even when a top of the printed circuit board is fixed to a top end of the slot bar 260, the printed circuit board may be prevented from being exposed to the outside of the housing module 20 through the front opening 21 and the rear opening 22. Thus, deterioration of the aesthetics of the display apparatus D due the front opening 21 and the rear opening 22 may be prevented.

In addition, the stand 20' supporting the housing module 20 may be fixed to an outer bottom face of the side plate 230.

Figure 12:
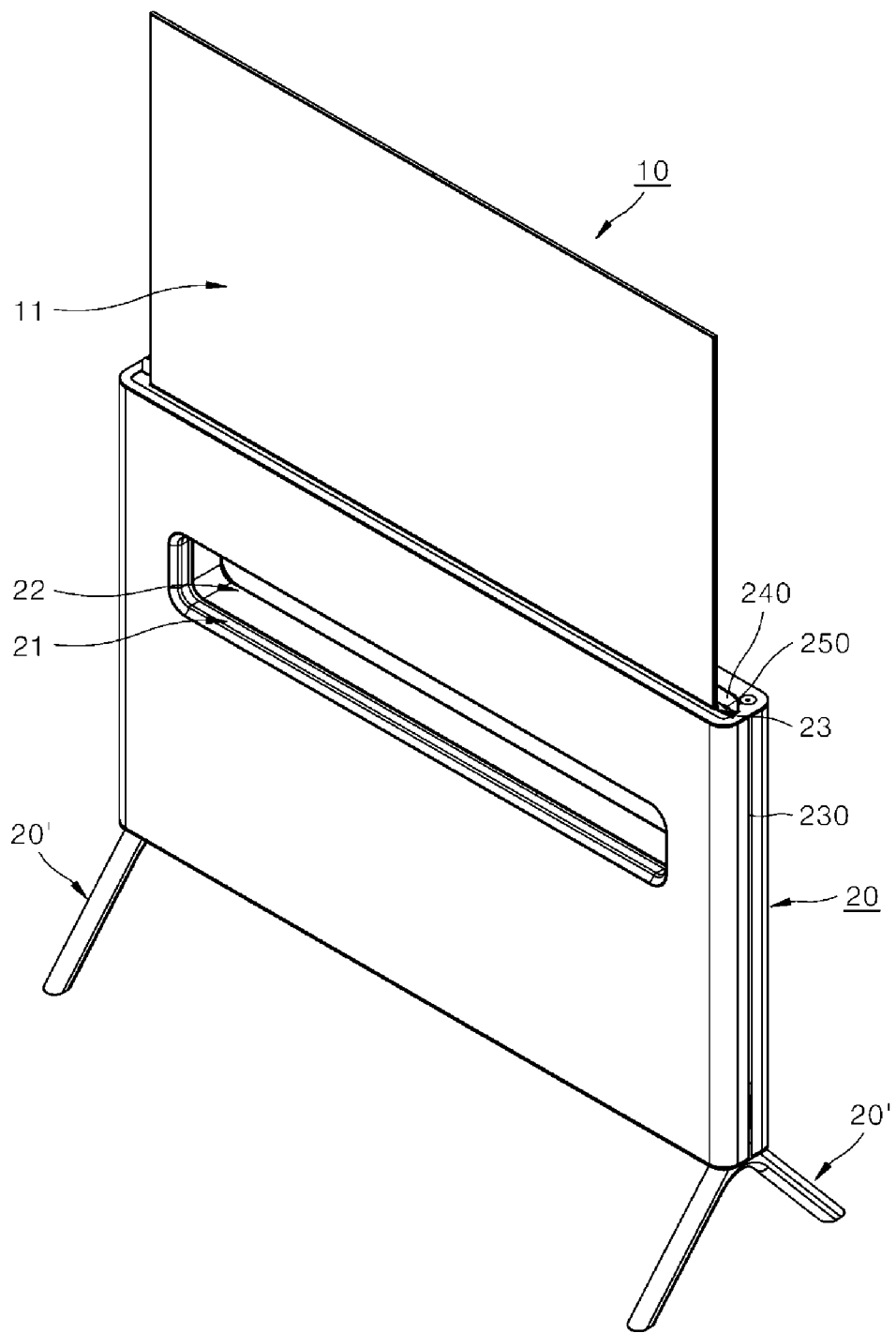

As shown in FIG. 12, in the general display mode GD, the display module 10 is lifted by the lifting module 30 until the entirety of the display region 11 protrudes upwardly through the top opening 23 of the housing module 20.

In this connection, the top plate 240 is opened and is supported by the display module 10 protruding upwards out of the housing module 20 through the top opening 23.

Moreover, the user located in front of the housing module 20 of the display apparatus D may visually recognize an object disposed behind the housing module 20 of the display apparatus D through the front opening 21 and the rear opening 22.

Figure 13:
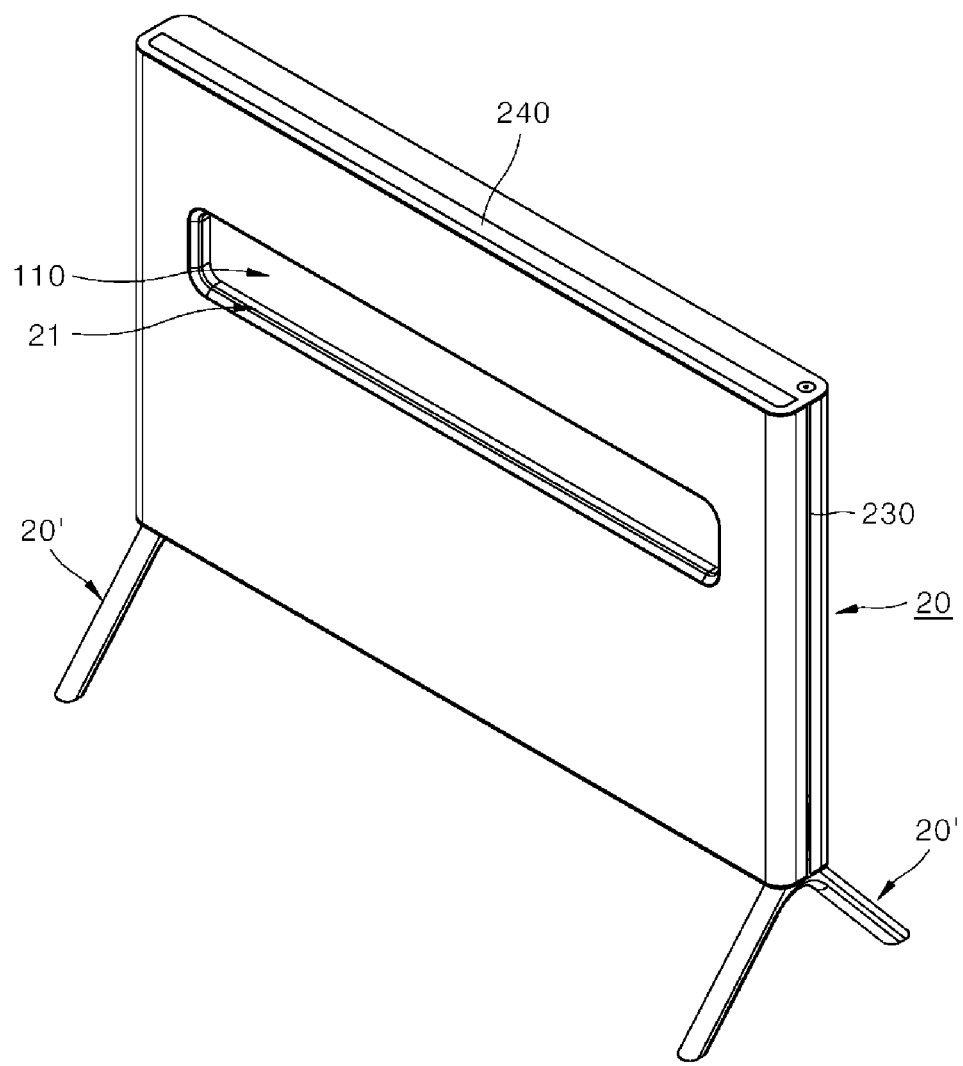

As shown in FIG. 13, in the stored mode SM, the display module 10 is lowered by the lifting module 30 until the entirety of the display module 10 is stored inside the housing module 20.

In this connection, the display module 10 is disposed completely inside the housing module 20.

Accordingly, the opened state of the top plate 240 is not maintained by the display module 10, and thus the top plate 240 is maintained in the closed state by the hinge 250.

Moreover, a portion of the front face of the display panel 110 corresponding to the display region 11 of the display module 10 is exposed to the outside of the housing module 20 through the front opening 21.

Figure 14:
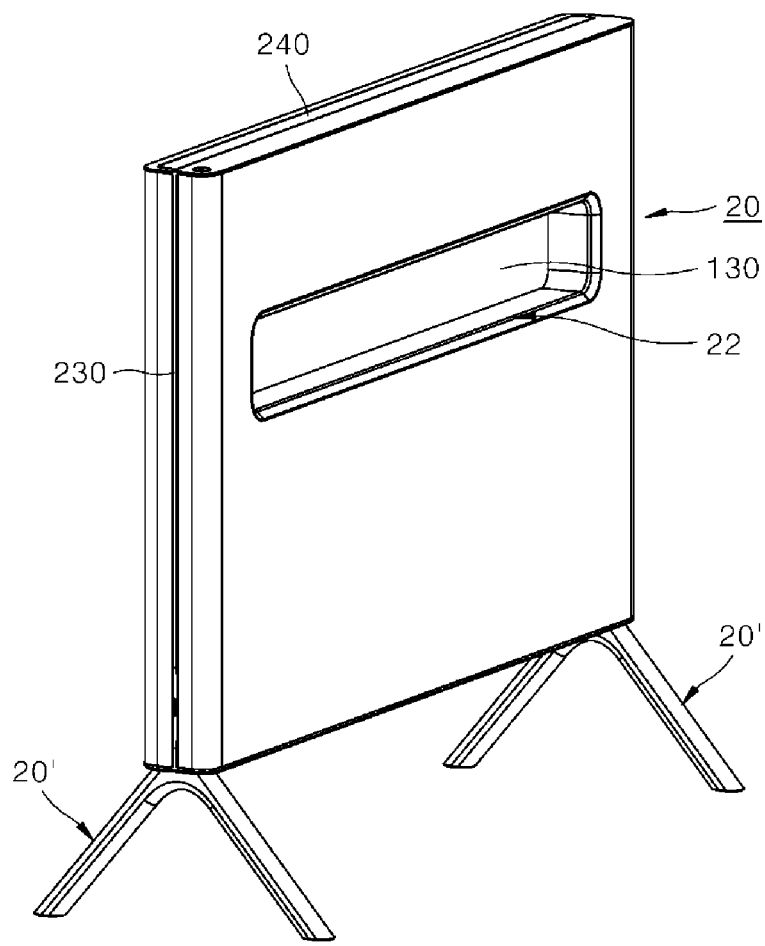

Further, as shown in FIG. 14, a portion of the protective cover 130 that constitutes a rear face of the display module 10 opposite to the display panel 110 is exposed to the outside of the housing module 20 through the rear opening 22.

Figure 15:
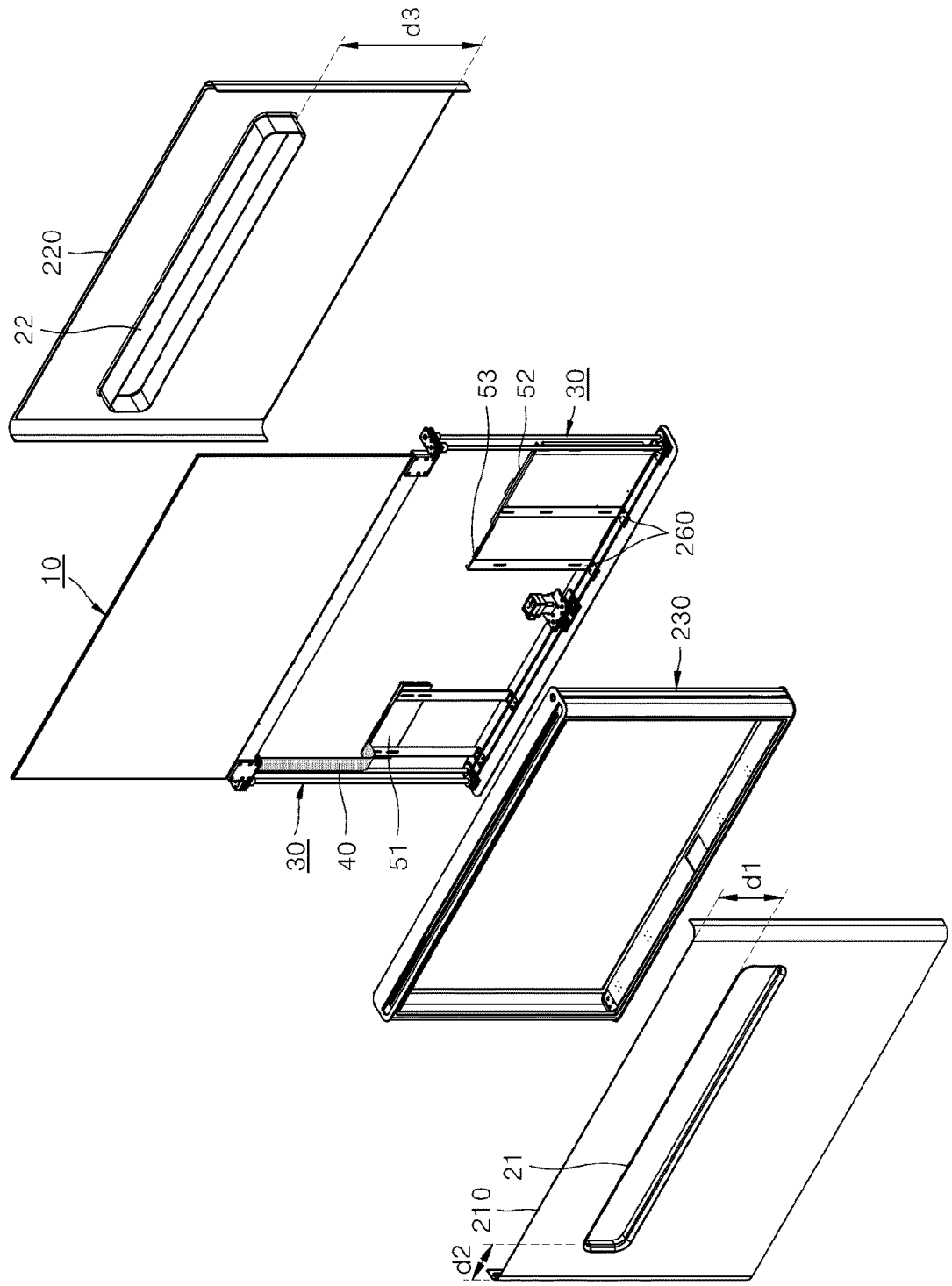

As shown in FIG. 15, each of the at least one printed circuit board 51, 52, and 53 may be disposed between and fixed to two adjacent slot bars 260 among the plurality of slot bars 260.

A top edge of each of the printed circuit boards 51, 52, and 53 may face the top end of the slot bar 260.

For example, one end of each of the printed circuit boards 51, 52, and 53 may be coupled to one of two adjacent slot bars 260 using fastening means such as a screw.

In this connection, each of a vertical dimension of each printed circuit board 51, 52, and 53 and a vertical dimension L260 of the slot bar 260 is smaller than the spacing d3 between the bottom edge of the back plate 220 and the rear opening 22. In this way, each of the printed circuit boards 51, 52, and 53 disposed between the display module 10 and the back plate 220 and fixed to the slot bars 260 may be prevented from being visually recognized by the user through the rear opening 22 or the front opening 21

Further, at least one printed circuit board 51, 52, and 53 and the plurality of slot bars 260 are spaced from the lifting module 30. In this way, a physical shock applied to the at least one printed circuit board 51, 52, and 53 when the lifting module 30 is activated may be reduced.

In one example, the at least one printed circuit board 51, 52, and 53 may include at least one of a timing controller 51, a power board 52, or a main board 53.

The timing controller 51 supplies timing driving signals to the gate driver and data driver of the display panel 110. The power board 52 supplies a power signal to the display panel 110. The main board 53 supplies control signals to the timing controller 51 and the power board 52. Further, the main board 53 may further supply a control signal to control a motor assembly (350 in FIG. 16) of the lifting module 30.

The signal cable 40 is connected to and disposed between the at least one printed circuit board 51, 52, and 53 and the display panel 110, and transmits the timing driving signal, the power signal and the control signal from the at least one printed circuit board 51, 52, and 53 to the display panel 110.

The signal cable 40 connected to the display panel 110 is drawn out through the cable outlet hole 121 of the support cover 120. A portion of the signal cable 40 extends in a parallel manner to a portion of the lower edge of the support cover 120 until the cable reaches one end of the lower edge of the support cover 120. The portion of the signal cable 40 extending in parallel to the portion of the lower edge of the support cover 120 is covered with the auxiliary cover 140.

The signal cable 40 is bent downwards from one end of the lower edge of the support cover 120 and thus extends far away from the display panel 110 and then enters the interior of the housing module 20. Thus, another portion of the signal cable 40 extends in a parallel manner to one side of the side plate 230 of the housing module 20, and then is connected to one printed circuit board 51.

Another portion of the signal cable 40 disposed inside the housing module 20 is disposed between the side plate 230 and the front opening 21.

In this connection, a width of the signal cable 40 is smaller than a spacing between the front opening 21 and a side of the side plate 230.

In this way, the signal cable 40 disposed inside the housing module 20 may be prevented from being visually recognized by the user out of the housing module 20 through the front opening 21 and the rear opening 22.

As described above, as the housing module 20 of the display apparatus D according to an aspect of the present disclosure includes the front opening 21, the display module 10 entirely housed in the housing module 20 may implement the AOD function through the front opening 21 in the stored mode SM.

Further, as the housing module 20 includes the front opening 21 and the rear opening 22, an object screened by the display apparatus D may be visible to the user through the front opening 21 and the rear opening 22 in a state where the display module 10 is not disposed between the front opening 21 and the rear opening 22 in the general display mode GD and the cinema display mode CD, thereby to improve the aesthetics of the indoor interior.

Next, the lifting module 30 of the display apparatus D according to an aspect of the present disclosure will be described.

Figure 16:
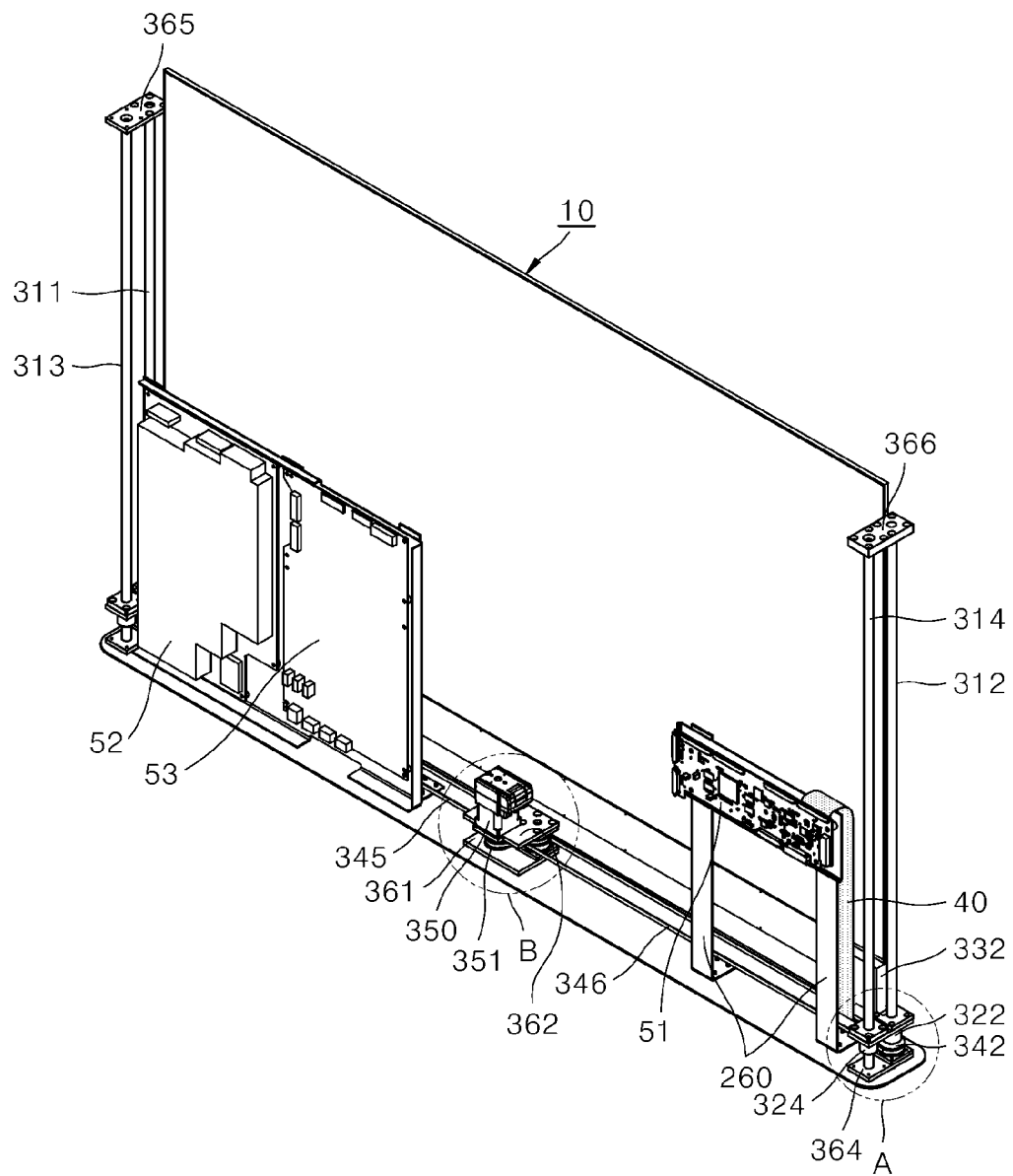
FIG. 16, FIG. 17, FIG. 18, FIG. 19, and FIG. 20 are diagrams showing a lifting module of a display apparatus according to an aspect of the present disclosure.
Figure 17:
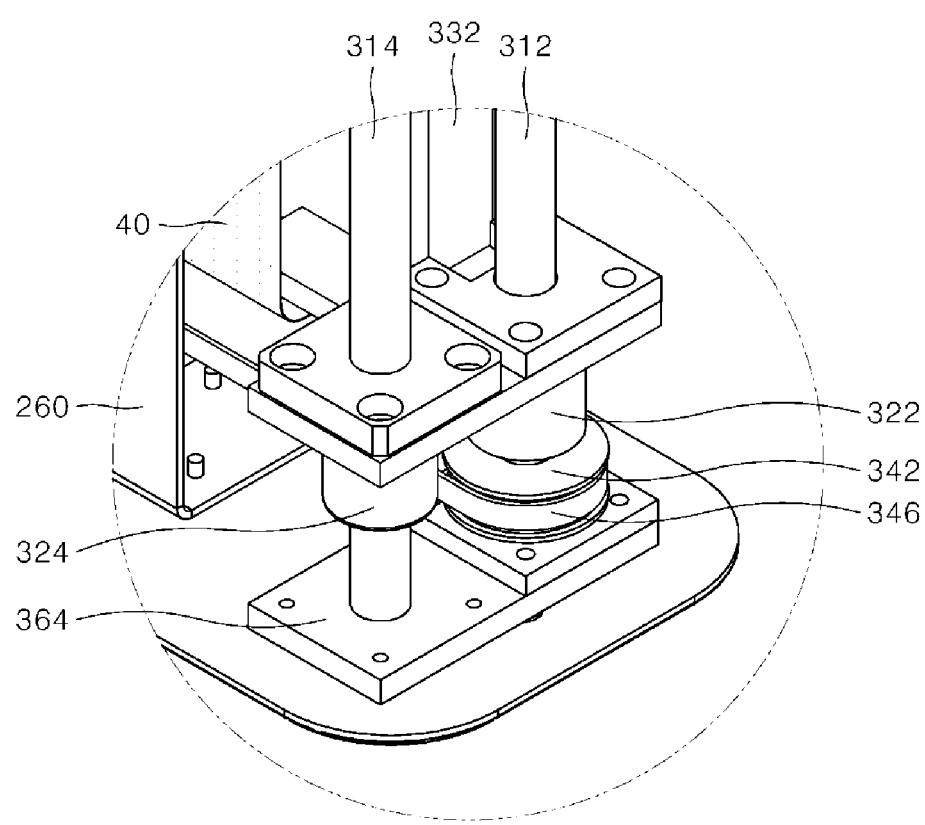
Figure 18:
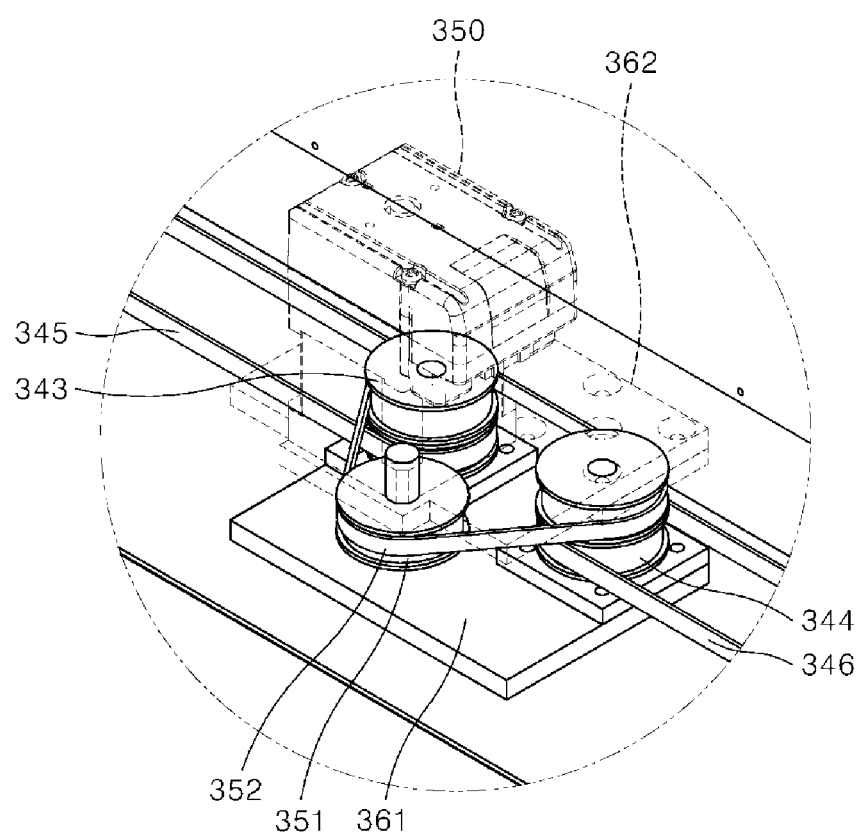
Figure 19:
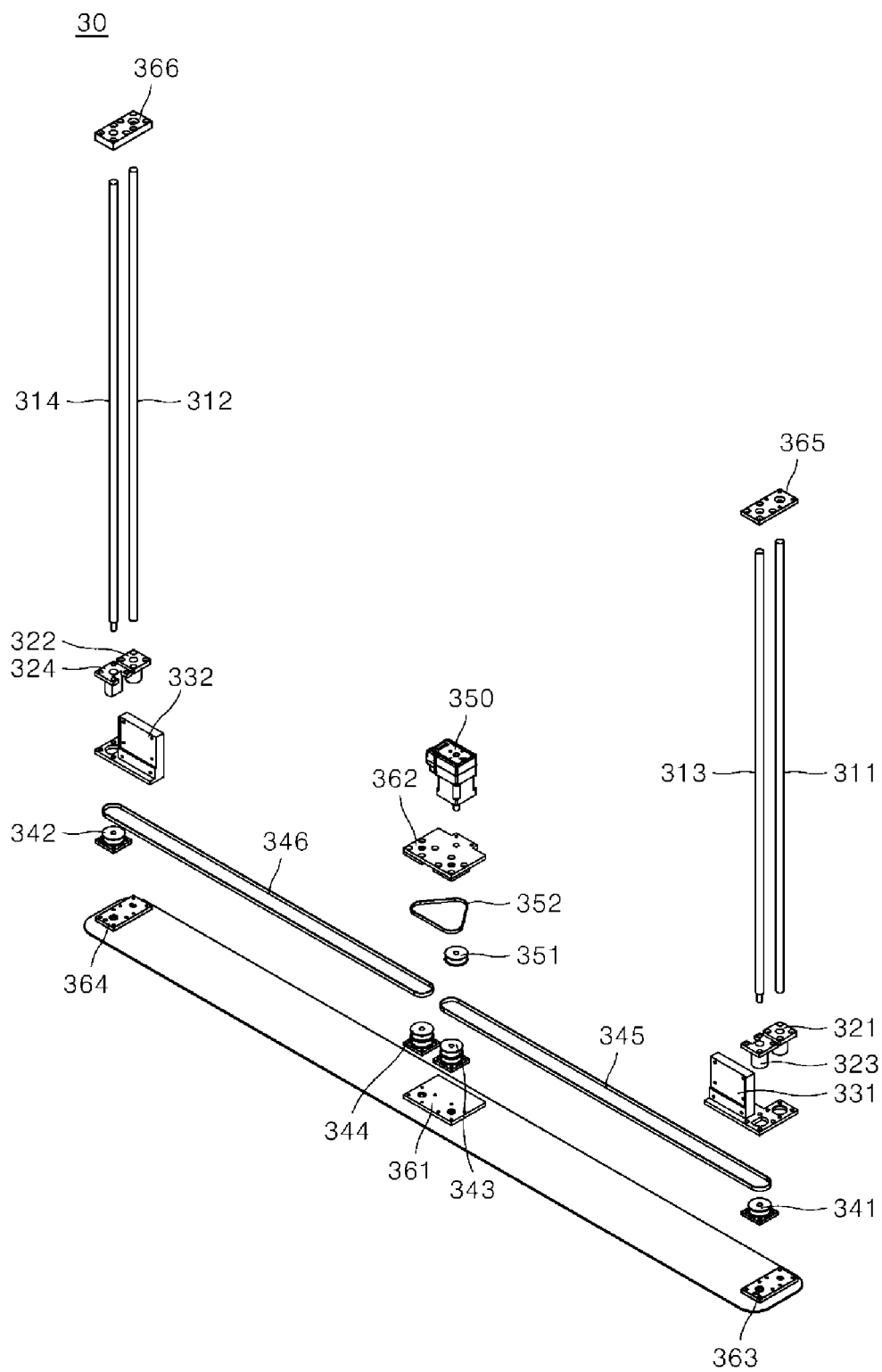
Figure 20:
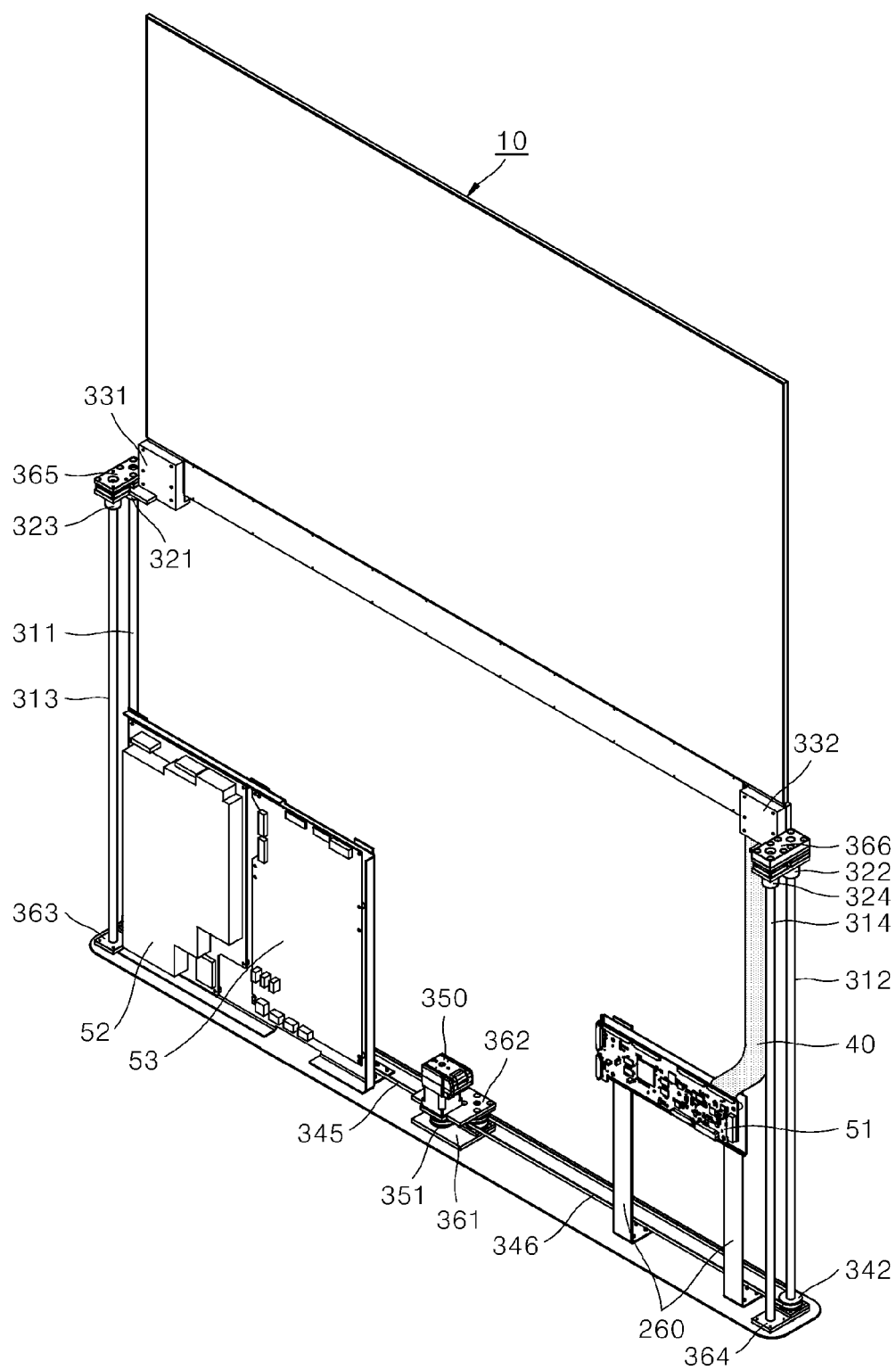

FIG. 16, FIG. 17, FIG. 18, FIG. 19, and FIG. 20 are diagrams showing a lifting module of a display apparatus according to an aspect of the present disclosure. In this connection, FIG. 16 is a rear perspective view of the display module and the lifting module in the stored mode. FIG. 17 is an enlarged view of a part A in FIG. 16. FIG. 18 is an enlarged view of a part B of FIG. 16. FIG. 19 is an exploded perspective view of the lifting module shown in FIG. 16. FIG. 20 is a rear perspective view of the display module and the lifting module in the general display mode.

As shown in FIG. 16 and FIG. 19, the lifting module 30 of the display apparatus D according to an aspect of the present disclosure includes first and second linear screws 311 and 312 which extend in a parallel manner to both vertical sides of the side plate 230, respectively, a first ball nut 321 fastened to the first linear screw 311, a second ball nut 322 fastened to the second linear screw 312, a first holder 331 disposed at one side of a lower edge of the support cover 120 of the display module 10 to hold the first ball nut 321, a second holder 332 disposed at the other side of the lower edge of the support cover 120 of the display module 10 to hold the second ball nut 322, a first side pulley 341 connected to one end of the first linear screw 311, a second side pulley 342 connected to one end of the second linear screw 312, the motor assembly 350 disposed on a bottom face of the side plate 230, a main pulley 351 connected to a drive shaft of the motor assembly 350, first and second central pulleys 343 and 344 adjacent to the main pulley 351 and facing away the first and second side pulleys 341 and 342, respectively, a first side belt 345 connecting the first central pulley 343 and the first side pulley 341 to each other, and a second side belt 346 connecting the second central pulley 344 and the second side pulley 342 to each other.

Further, the lifting module 30 may further include first, second, third, fourth, fifth and sixth bases 361, 362, 363, 364, 365, and 366 fixed to the side plate 230.

Each of the first to sixth bases 361, 362, 363, 364, 365, and 366 is spaced apart from the plurality of slot bars 260 disposed inside the side plate 230 and is spaced from the top opening (23 in FIG. 11).

The first base 361 is disposed on the bottom face of the side plate 230, and is spaced from the plurality of slot bars 260. In one example, the first base 361 may be disposed in a center region of the bottom face of the side plate 230.

The second base 362 is disposed above and faces away the first base 361.

As shown in FIG. 18, the first and second central pulleys 343 and 344 are fixedly disposed between the first and second bases 361 and 362.

The main pulley 351 is disposed between the first and second bases 361 and 362, and is spaced from the first and second central pulleys 343 and 344, and is fixed to the second base 362.

The motor assembly 350 is disposed on the second base 362.

The main pulley 351 connected to the drive shaft of the motor assembly 350 is connected to the first and second central pulleys 343 and 344 via the main belt 352. That is, power of the motor assembly 350 is transmitted to each of the first and second central pulleys 343 and 344 via the main pulley 351 and the main belt 352.

The first central pulley 343 is connected to the first side pulley 341 via the first side belt 345. Accordingly, the power of the motor assembly 350 is transmitted to the first side pulley 341 via the main pulley 351, the main belt 352, the first central pulley 343 and the first side belt 345.

The second central pulley 344 is connected to the second side pulley 342 via the second side belt 346. Accordingly, the power of the motor assembly 350 is transmitted to the second side pulley 342 via the main pulley 351, the main belt 352, the second central pulley 344 and the second side belt 346.

The third and the fourth bases 363 and 364 are respectively disposed on both ends of the bottom face of side plate 230.

The fifth base 365 is disposed at one end of a top face of the side plate 230 and faces away the third base 363.

The sixth base 366 is disposed at the other end of the top face of the side plate 230, and faces away the fourth base 364.

The first linear screw 311 is disposed between the third base 363 and the fifth base 365 and is fastened to the third base 363 and the fifth base 365.

The first side pulley 341 transfers the power transmitted from the motor assembly 350 via the main pulley 351, the main belt 352, the first central pulley 343 and the first side belt 345 to the first linear screw 311 to rotate the first linear screw 311.

The first ball nut 321 moves vertically along the first linear screw 311 when the first linear screw 311 rotates.

The first holder 331 moves vertically together with the first ball nut 321.

As shown in FIG. 19, the second linear screw 312 is disposed between the fourth base 364 and the sixth base 366 and is fastened to the fourth base 364 and the sixth base 366.

The second side pulley 342 transfers the power transmitted from the motor assembly 350 via the main pulley 351, the main belt 352, the second central pulley 344 and the second side belt 346 to the second linear screw 312 to rotate the second linear screw 312.

The second ball nut 322 moves vertically along the second linear screw 312 when the second linear screw 312 rotates.

The second holder 332 moves vertically together with the second ball nut 322.

Thus, the display module 10 fixed to the first and second holders 331 and 332 may move vertically together with the first and second ball nuts 321 and 322.

Each of the first to sixth bases 361, 362, 363, 364, 365, and 366 fixed to the side plate 230 is spaced from the plurality of slot bars 260 disposed in the side plate 230 and is spaced from the front opening 231. Thus, the lifting module 30 is spaced from the display module 10 entering and exiting the housing module 30 and at least one printed circuit board 51, 52, and 53 disposed in the housing module 30. Thus, damage to the display module 10 and the at least one printed circuit board 51, 52, and 53 due to physical impact thereto caused when the lifting module 30 is activated may be reduced.

Further, the lifting module 30 of the display apparatus D according to an aspect of the present disclosure may further include a first auxiliary screw 313 disposed adjacent to the first linear screw 311, a second auxiliary screw 314 disposed adjacent to the second linear screw 312, a first auxiliary nut 323 fastened to the first auxiliary screw 313, and a second auxiliary nut 324 fastened to the second auxiliary screw 314.

The first auxiliary screw 313 is fixed to the third base 363 and the fifth base 365 as the first linear screw 311 is.

The first auxiliary nut 323 is fastened to the first auxiliary screw 313 and is horizontally adjacent to and fixed to the first ball nut 321. Thus, the first auxiliary nut 323 moves vertically along the first auxiliary screw 313 together with the first ball nut 321.

The first auxiliary nut 323 is fixed to one side of the lower edge of the support cover 120 via the first holder 331 as the first ball nut 321 is.

The second auxiliary screw 314 is fixed to the fourth base 364 and the sixth base 366 as the second linear screw 312 is.

The second auxiliary nut 324 is fastened to the second auxiliary screw 314 and is fixed to and horizontally adjacent to the second ball nut 322.

The second auxiliary nut 324 moves vertically along the second auxiliary screw 314 together with the second ball nut 322.

The second auxiliary nut 324 is fixed to the other side of the lower edge of the support cover 120 via the second holder 332 as the second ball nut 322 is.

The display module 10 may be further supported by the first and second auxiliary screws 313 and 314 and the first and second auxiliary nuts 323 and 324, such that the vertical level of the display module 10 may be fixed in a more reliable manner.

As shown in FIG. 16, in the stored mode SM, the first and second ball nuts 321 and 322 may be respectively adjacent to bottoms of the first and second linear screws 311 and 312 when the motor assembly 350 is activated. In this connection, the first and second holder 331 and 332 may be respectively adjacent to the bottoms of the first and second linear screws 311 and 312. The first and second auxiliary nuts 323 and 324 may be respectively adjacent to bottoms of the first and second auxiliary screws 313 and 314.

Thus, the entirety of the display region 11 of the display module 10 is housed inside the housing module 20.

In this connection, both sides of the display module 10 are respectively spaced from the first and second linear screws 311 and 312 and the first and second auxiliary screws 313 and 314. A physical shock caused by operation of the first and second linear screws 311 and 312 and the first and second auxiliary screws 313 and 314 may be prevented from being applied to the display module 10.

Moreover, as shown in FIG. 20, in the general display mode GD, the first and second ball nuts 321 and 322 may be respectively adjacent to tops of the first and second linear screws 311 and 312 when the motor assembly 350 is activated. In this connection, the first and second holders 331 and 332 may be respectively adjacent to the tops of the first and second linear screws 311 and 312. The first and second auxiliary nuts 323 and 324 may be respectively adjacent to tops of the first and second auxiliary screws 313 and 314.

Thus, the display module 10 protrudes upwards through the top opening 23 of the housing module 20. The entirety of the display region 11 of the display module 10 is exposed to the outside of the housing module 20.

In addition, in any mode of the stored mode SM and the general display mode GD, both sides of the display module 10 are respectively spaced from the first and second linear screws 311 and 312 and the first and second auxiliary screws 313 and 314. A physical shock caused by operation of the first and second linear screws 311 and 312 and the first and second auxiliary screws 313 and 314 may be prevented from being applied to the display module 10.

As described above, the display apparatus D according to an aspect of the present disclosure includes the housing module 20 that may accommodate therein the entirety of the display module 10, such that the aesthetics of the display apparatus D may be improved due to the housing module 20. Further, an object screened by and behind the display apparatus D may be visually recognized by the user through the front opening 21 and the rear opening 22 of the housing module 20. Thus, the display apparatus may function as a portion of the indoor interior. Accordingly, deterioration of the aesthetics of the indoor interior due to the display apparatus D may be minimized.

Moreover, in the stored mode SM, displaying the AOD data in the portion of the display region 11 of the display module 10 as exposed through front opening 21 may allow the display apparatus D to execute the AOD function.

Further, the vertical level of the display module 10 may be changed by the lifting module 30. Thus, placing a portion of the display module 10 inside the housing module 20 may allow presenting of screens optimized for images at various screen ratios. Accordingly, the convenience and utility of the display apparatus D may be improved.

As described above, the present disclosure is described with reference to the drawings. However, the present disclosure is not limited to the aspects and drawings disclosed in the present specification. It will be apparent that various modifications may be made thereto by those skilled in the art within the scope of the present disclosure. Furthermore, although the effect resulting from the features of the present disclosure has not been explicitly described in the description of the aspects of the present disclosure, it is obvious that a predictable effect resulting from the features of the present disclosure should be recognized.

What is claimed is:

1. A display apparatus comprising:
a display module being in a flat-shape and including a display panel for displaying an image;
a housing module for housing the flat-shaped display module; and
a lifting module disposed inside the housing module and enabling the flat-shaped display module lifting or lowering in a vertical direction,
wherein the housing module includes:
a front plate including a front opening corresponding to a portion of a display region of the display panel;
a back plate including a rear opening being opposite to the front opening; and
a side plate disposed between the front plate and the back plate and having a shape of a frame,
wherein the side plate includes a plurality of slot bars fixed to a bottom face of the side plate, two adjacent slot bars of the plurality of slot bars fix at least one printed circuit board for activating the display panel,
wherein at least one printed circuit board fixed to the bottom face of the side plate when the flat-shaped display module lifting or lowering in a vertical direction by the lifting module,
wherein, in a stored mode in which an entirety of the display module is housed in the housing module, the portion of the display region is exposed to an outside of the housing module through the front opening,
wherein the display module further includes a support cover disposed over a rear surface of the display panel and a side cover disposed between an edge of the display panel and an edge of the support cover, and
wherein the support cover supports an entirety of the display panel.

2. The display apparatus of claim 1, wherein, in the stored mode, the display module displays Always On Display (AOD) data in the portion of the display region corresponding to the front opening, based on an AOD request signal received through a user input interface.

3. The display apparatus of claim 1, wherein, upon receipt of a stored mode request signal through a user input interface, the lifting module lowers the display module until the display module is housed inside the housing module, and
wherein, upon receipt of a general display mode request signal through the user input interface, the lifting module lifts the display module until the display region of the display module is exposed to an outside of the housing module.

4. The display apparatus of claim 3, wherein, upon receipt of a cinema display mode request signal through the user input interface, the lifting module lifts or lowers the display module lifts until a portion of the display region corresponding to a screen ratio of the cinema display mode is exposed to the outside of the housing module, and wherein the screen ratio of the cinema display mode is different from a screen ratio of the general display mode.

5. The display apparatus of claim 3, wherein
the front plate contacting a front face of the display panel constituting the display region; and
the back plate facing away the front plate and having the rear opening defined therein, wherein the display panel is disposed between the front and back plates.

6. The display apparatus of claim 5, wherein, in the stored mode, a portion of a rear face of the display module opposite to the front face of the display panel is exposed to the outside of the housing module through the rear opening, and
wherein, in a general display mode, an object disposed behind the housing module is visible to a user located in front of the housing module through the front opening and the rear opening.

7. The display apparatus of claim 1, wherein, when the display module is raised or lowered by the lifting module, the display module exits or enters the housing module while passing through a top opening defined in a portion of a top face of the side plate.

8. The display apparatus of claim 7, wherein the housing module further includes:
a top plate covering the top opening; and
a hinge disposed between the side plate and the top plate to allow the top plate to open and close the top opening,
wherein, when the display module is housed inside the housing module, the top plate closes the top opening, and
wherein, when at least a portion of the display module protrudes upwards out of the housing module through the top opening, the top plate is pivoted up by the display module to open the top opening.

9. The display apparatus of claim 1, wherein the support cover has a cable outlet hole through which a signal cable connected to the display panel is drawn out.

10. The display apparatus of claim 9,
wherein the signal cable drawn out through the cable outlet hole and the at least one printed circuit board are stored inside the housing module.

11. The display apparatus of claim 1,
wherein a vertical dimension of each of the plurality of slot bars is smaller than a spacing between the front opening and a bottom edge of the front plate.

12. The display apparatus of claim 10, wherein the signal cable drawn out through the cable outlet hole extends along a portion of a lower edge of the support cover, and then is bent at one end of the lower edge of the support cover, and then extends along a side of the side plate.

13. The display apparatus of claim 12, wherein, in a general display mode, a portion of the signal cable is disposed between a side edge of the front plate and the front opening, and
wherein a width of the signal cable is smaller than a spacing between the front opening and the side edge of the front plate.

14. The display apparatus of claim 12, wherein the display module further includes:
a protective cover contacting the support cover, fixed to the support cover, and covering the cable outlet hole; and
an auxiliary cover disposed on the lower edge of the support cover,
wherein the auxiliary covers a portion of the signal cable extending along a portion of the lower edge of the support cover.

15. The display apparatus of claim 14, wherein a thickness of the support cover is greater than each thickness of the display panel and the protective cover.

16. A display apparatus comprising:
- a display module being in a flat-shape and including a display panel having a display region in which an image is displayed;
- a lifting module for lifting or lowering the flat-shaped display module; and
- a housing module for housing therein the flat-shaped display module and the lifting module, wherein the housing module includes:
- a front plate including a front opening corresponding to a portion of a display region of the display panel;
- a back plate including a rear opening being opposite to the front opening; and
- a side plate disposed between the front plate and the back plate and having a shape of a frame, wherein the side plate includes a plurality of slot bars fixed to a bottom face of the side plate, two adjacent slot bars of the plurality of slot bars fix at least one printed circuit board for activating the display panel, wherein at least one printed circuit board fixed to the bottom face of the side plate when the flat-shaped display module lifting or lowering in a vertical direction by the lifting module, wherein the display module further includes a support cover disposed over a rear surface of the display panel and a side cover disposed between an edge of the display panel and an edge of the support cover, wherein the support cover supports an entirety of the display panel, and wherein the display apparatus is configured to operate in at least one of:
- a vertical movement mode in which a vertical level of the display module is changed by the lifting module;
- a stored mode in which an entirety of the display module is housed inside the housing module;
- a general display mode in which an image is displayed in an entirety of the display region; and
- a cinema display mode in which the image is displayed in a rest of the display region except for a portion housed in the housing module.

17. The display apparatus of claim 16, wherein
- the front plate contacting a front face of the display panel constituting the display region; and
- the back plate facing away the front plate and having the rear opening defined therein, wherein the display panel is disposed between the front and back plates.

18. The display apparatus of claim 16, wherein, in the stored mode, the portion of the display region is exposed to an outside of the housing module through the front opening, and a portion of a rear face of the display module opposite to the front face of the display panel is exposed to the outside of the housing module through the rear opening.

19. The display apparatus of claim 16, wherein in the stored mode, the display module displays Always On Display (AOD) data in the portion of the display region corresponding to the front opening, based on an AOD request signal received through a user input interface.

20. The display apparatus of claim 16, wherein, in each of the vertical movement mode, the general display mode, and the cinema display mode, the display module enters and exits the housing module while passing through a top opening defined in a portion of a top face of the side plate.

21. The display apparatus of claim 16, wherein the display module further includes:
- a protective cover contacting the support cover and fixed to the support cover; and
- an auxiliary cover disposed on a lower edge of the support cover, wherein the support cover has a cable outlet hole through which a signal cable connected to the display panel is drawn out, wherein the support cover is thicker than each thickness of the display panel and the protective cover, wherein the protective cover covers the cable outlet hole, and wherein the auxiliary cover covers a portion of the signal cable drawn out of the signal cable through the cable outlet hole and extending along the lower edge of the support cover.

22. The display apparatus of claim 16,
wherein a vertical dimension of each of the plurality of slot bars is smaller than a spacing between the front opening and a bottom edge of the front plate.

23. The display apparatus of claim 21, wherein the signal cable drawn out through the cable outlet hole extends along a portion of the lower edge of the support cover, and then is bent at one end of the lower edge of the support cover, and then extends along a side of the side plate, wherein, in the general display mode, another portion of the signal cable disposed inside the housing module is disposed between a side edge of the front plate and the front opening, and wherein a width of the signal cable is smaller than a spacing between the front opening and the side edge of the front plate.

* * * * *